(12) United States Patent
Ma et al.

(10) Patent No.: US 8,995,043 B2
(45) Date of Patent: Mar. 31, 2015

(54) INTERFEROMETRIC MODULATOR WITH DUAL ABSORBING LAYERS

(75) Inventors: Jian J. Ma, Carlsbad, CA (US); Tallis Y. Chang, San Diego, CA (US); John H. Hong, San Clemente, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 131 days.

(21) Appl. No.: 13/306,877

(22) Filed: Nov. 29, 2011

(65) Prior Publication Data

US 2013/0135319 A1 May 30, 2013

(51) Int. Cl.
G02B 26/02 (2006.01)

(52) U.S. Cl.
USPC .......................................... 359/290

(58) Field of Classification Search
None
See application file for complete search history.

(56) References Cited

U.S. PATENT DOCUMENTS

| | | | |
|---|---|---|---|
| 5,103,340 A | 4/1992 | Dono et al. | |
| 6,040,937 A | 3/2000 | Miles | |
| 6,674,562 B1 | 1/2004 | Miles | |
| 6,833,957 B2 | 12/2004 | Sato | |
| 7,123,216 B1 | 10/2006 | Miles | |
| 7,304,784 B2 | 12/2007 | Chui et al. | |
| 7,327,510 B2 | 2/2008 | Cummings et al. | |
| 7,612,933 B2 | 11/2009 | Djordjev | |
| 7,733,553 B2 | 6/2010 | Faase et al. | |
| 7,957,049 B1 | 6/2011 | Parry-Jones | |
| 7,999,995 B2 | 8/2011 | Hashimura et al. | |
| 2002/0015215 A1 | 2/2002 | Miles | |
| 2002/0070931 A1 | 6/2002 | Ishikawa | |
| 2002/0080465 A1 | 6/2002 | Han et al. | |
| 2002/0167730 A1 | 11/2002 | Needham et al. | |
| 2006/0067633 A1 | 3/2006 | Gally et al. | |
| 2008/0055706 A1 | 3/2008 | Chui et al. | |
| 2010/0315696 A1 | 12/2010 | Lee et al. | |
| 2011/0069371 A1 | 3/2011 | Kothari et al. | |
| 2014/0036343 A1* | 2/2014 | Ma et al. ....................... 359/291 |

FOREIGN PATENT DOCUMENTS

WO    WO 98/14804    4/1998

OTHER PUBLICATIONS

Viktorovitch et al., "Design and fabrication of optical microcavities using III-V Semiconductor-based MOEMS", MOEMS and Minaturized Systems, Proceedings of SPIE vol. 4178, pp. 298-309, 2000.

(Continued)

*Primary Examiner* — Derek S Chapel
(74) *Attorney, Agent, or Firm* — Knobbe Martens Olson & Bear LLP

(57) ABSTRACT

This disclosure provides systems, methods and apparatus related to an electromechanical display device. In one aspect, an analog interferometric modulator includes a reflective display pixel having a reflector, and a movable first absorbing layer positionable at a distance d1 from the reflector, the first absorbing layer and the reflector defining a first gap therebetween. The apparatus also includes a second absorbing layer disposed at a distance d2 from the first absorbing layer, the first absorbing layer disposed between the second absorbing layer and the reflector, the second absorbing layer and the first absorbing layer defining a second gap therebetween. In addition, at least two of the reflector, the first absorbing layer and second absorbing layer are movable to synchronously either increase or decrease the thickness dimension of the first gap and the second gap.

12 Claims, 25 Drawing Sheets

(56) References Cited

OTHER PUBLICATIONS

Seeger, et al., Dynamics and Control of Parallel-Plate Actuators Beyond the Electrostatic Instability, Transducers '99, The 10$^{th}$ International Conference on Solid-State Sensors and Actuators, Sendai, Japan, Jun. 7-9, 1999, pp. 474-477.

International Search Report and Written Opinion—PCT/US2012/066542—ISA/EPO—Feb. 21, 2013.

* cited by examiner

Common Voltages

| | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| Segment Voltages | $VS_H$ | Stable | Stable | Relax | Stable | Actuate |
| | $VS_L$ | Actuate | Stable | Relax | Stable | Stable |

INTERFEROMETRIC MODULATOR WITH DUAL ABSORBING LAYERS

TECHNICAL FIELD

This disclosure relates to electromechanical systems.

DESCRIPTION OF THE RELATED TECHNOLOGY

Electromechanical systems (EMS) include devices having electrical and mechanical elements, actuators, transducers, sensors, optical components (such as mirrors and optical film layers) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an electromechanical display apparatus, including a reflective display pixel. The reflective display pixel includes a reflector, a partially transmissive first absorbing layer, a first gap, a partially transmissive second absorbing layer, and a second gap. The first absorbing layer and the reflector define the first gap, which has a thickness dimension of distance $d1$. The first absorbing layer and the second absorbing layer define the second gap, which has a thickness dimension of distance $d2$. At least two of the reflector, the first absorbing layer and second absorbing layer are movable to either increase or decrease the thickness dimensions of the first gap and the second gap.

The distance $d1$ can be less than 700 nm and the sum of the distances $d1$ and $d2$ can be less than 1400 nm. The display pixel can be configured such that given a range of received light wavelengths min to $\lambda$max, distance $d1 < \lambda$max, and $d1+d2 < 2$ μmax. In some implementations, the first absorbing layer and second absorbing layer are correspondingly movable such that the difference between the distance $d1$ and the distance $d2$ is less than 50 nm. At least two of the reflector, the first absorbing layer and second absorbing layer can be movable such that the distances $d1$ and $d2$ are between about 0 and 315 nm. At least two of the reflector, the first absorbing layer and second absorbing layer can be movable such that the distances $d1$ and $d2$ place the first absorbing layer and the second absorbing layer, respectively, at consecutive nulls, of a desired display color, from light reflecting from a reflector. The at least two absorbing layers can be movable such that $(|d2-d1|)/((d1+d2)/2)$ is less than or equal to 0.25. Also, the relationship between the two gap lengths can be $d2=d1+(10$ to $20$ nm$)$. In some implementations, the sum of the thickness of the first absorbing layer and the second absorbing layer can be between about 3 nm and 12 nm. In some implementations, the sum of the thickness of the first absorbing layer and the second absorbing layer is between about 5 nm and about 7 nm. Also, at least two of the reflector, the first absorbing layer and second absorbing layer can be movable such that the distances $d1$ and $d2$ place the first absorbing layer and the second absorbing layer at a distance of $\lambda/2 \pm 15$ nm and $\lambda \pm 15$ nm, respectively, from the reflector, for a target primary color of light having wavelength $\lambda$. The display pixel further can include a movable dielectric layer having a thickness of between about 100 nm and 300 nm, the first absorbing layer being deposed on the dielectric layer.

In another implementation, a method of forming an electromechanical display apparatus, can include forming a reflector, forming a sacrificial layer over the reflector, forming a first support structure, forming a first absorbing layer, forming a sacrificial layer over the first absorbing layer, forming a second support structure, forming a second absorbing layer, and forming a first gap between the reflector and the first absorbing layer and a second gap between the first absorbing layer and the second absorbing layer.

Another implementation includes an electromechanical display element, including a reflector, a first partially transmissive absorbing means for absorbing light, a second partially transmissive absorbing means for absorbing light, and means for driving at least two of the reflector, the first partially transmissive absorbing means and the second partially transmissive absorbing means. The first partially transmissive absorbing means is disposed at a distance $d1$ from the reflector, and the first partially transmissive absorbing means and the reflector define a first gap therebetween. The first gap has a variable height dimension of distance $d1$. The second partially transmissive absorbing means is disposed at a distance $d2$ from the first partially transmissive absorbing means such that the first partially transmissive absorbing means is between the second partially transmissive absorbing means and the reflector. The second partially transmissive absorbing means and the reflector define a second gap therebetween. The second gap has a variable height dimension of distance $d2$. The driving means increases or decreases the height dimensions of the first and second gaps placing the display element in a display state such that the difference between the distance $d1$ and the distance $d2$ is less than 100 nm.

Another innovative aspect of the subject matter can be implemented in a method of displaying information on a display element, the method including changing a height dimension $d1$ of a variable first gap, and changing a height dimension $d2$ of a variable second gap. The first gap is defined on one side by a first absorbing layer and on another side by a reflector, while the second gap is defined on one side by the first absorbing layer and on another side by a second absorbing layer. Changing the height dimensions d1 and d2 places the display element in a display state to reflect a certain color based at least in part on the height dimensions d1 and d2.

In another implementation, a non-transitory, computer readable storage medium has instructions stored thereon that cause a processing circuit to perform a method that includes changing a height dimension d1 of a variable first gap, and changing a height dimension d2 of a variable second gap. The first gap is defined on one side by a first absorbing layer and on another side by a reflector, while the second gap is defined on one side by the first absorbing layer and on another side by a second absorbing layer. Changing the height dimensions d1 and d2 places the display element in a display state to reflect a certain color based at least in part on the height dimensions d1 and d2.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
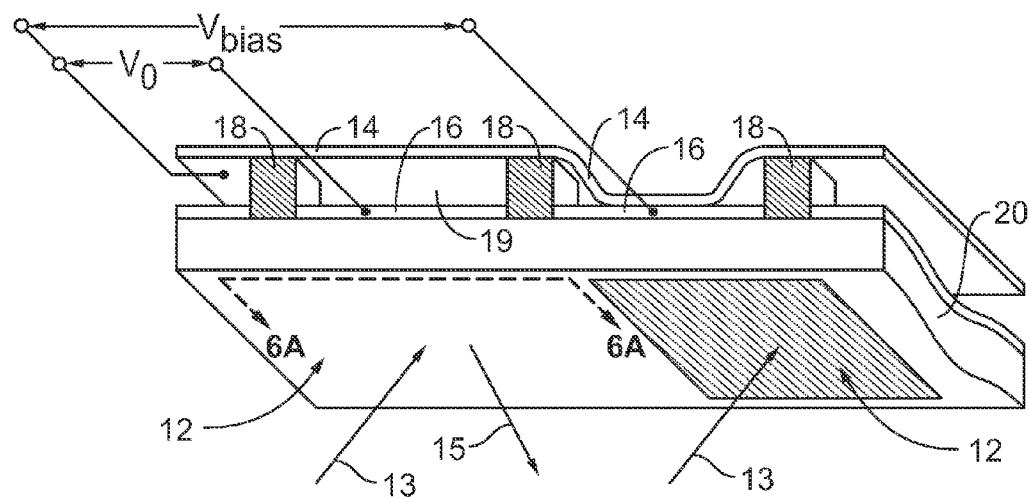
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, an interferometric modulator display element can have one or more movable mechanical layers that can be positioned in more than two positions, and such a device can be referred to as an analog interferometric modulator device (AIMOD). Each of the two or more positions causes the AIMOD to reflect light of a different wavelength. In some implementations, an AIMOD can include a dual interferometric gap structure and two absorber layers. Some implementations of an interferometric modulator having two gaps are static configurations, where the height dimensions of the gaps are not variable. Such gaps can include an air gap, or an optically transmissive material, as part of the gap. In implementations of an AIMOD having two variable gaps, the height dimension of the two gaps can be changed by moving at least one of the layers that define a side of the gap. For example, the AIMOD can include a first absorbing layer separated from a reflective surface of the AIMOD by a first gap and a second absorbing layer formed such that the first absorbing layer is between the second absorbing layer and the reflective surface, and the second absorbing layer is separated from the first absorbing layer by a second gap. The first absorbing layer can be driven to a certain position at a distance d1 from a reflective surface of the AIMOD, and a second absorbing layer can be driven to a certain position at a distance d2 from the reflective surface, such that the AIMOD reflects a desired color, or appears white or dark (so as to appear, for example, black). The two absorbing layers are configured to move synchronously relative to the reflective surface to keep the distances d1 and d2 at an optimum distance relationship to produce the desired color. The AIMOD can be configured such that the two absorbing layers are positionable so the distances d1 and d2 take into account that a portion of light incident on a reflective surface can penetrate the reflective surface to a certain depth, the depth based at least in part on the material forming the reflective surface. Accordingly, in determining the distances d1 and d2, such depth penetration can be taken into account. For example, in some implementations, the light penetration depth can be defined by the depth into the reflective surface where a light intensity value is 10% of the light intensity value at the reflective surface itself (that is, where incident light first strikes the reflective surface). In some implementations where the reflective surface is aluminum, a light intensity drop of 90% corresponds with a penetration depth of about 15 nm. Accordingly, in such implementations, the height of the first and second gaps d1 and d2 can be the distance between the first absorbing layer and the reflective surface+15 nm.

Particular implementations of the subject matter described in this disclosure can be implemented to realize one or more of the following potential advantages. An AIMOD element having a dual gap structure and two absorbing layers can provide better color saturation than an AIMOD having a single gap and a single absorbing layer. Achieving good color saturation of the primary color setting in the AIMOD element requires sufficient absorption loss to the non-preferred primary colors and minimum loss to the preferred primary. An incident wave at wavelength $\lambda$ will interfere with its own reflection from the mirror to create a standing wave with local peaks and nulls. For that wavelength, a very thin absorber placed at one of the null positions with respect to a wavelength $\lambda$ will absorb very little energy, but it will absorb energy of other wavelengths that are not at a null and have higher energy at that position. With a single absorber, it is difficult to achieve good color saturation even with sophisticated multi-stack optical thin film coatings. The main reason for the difficulty is that the null of one primary color local field intensity does not spatially overlap with the peak of the field intensity of other primary colors, and the mix of the leaked color due to insufficient absorption broadens the spectrum, resulting in poor color saturation when the device is viewed. Increasing an absorbing layer from its optimum thickness decreases the overall brightness. However, a second thin absorber placed at the second null of wavelength $\lambda$ (the wavelength of light desired to be reflected from the display element) provides a low absorption to the wavelength $\lambda$ of light that is desired to be reflected and a larger absorption for wavelengths of light other than wavelength $\lambda$. This results in the display element being able to reflect more saturated colors over a broader spectrum, and thus increases color gamut of the display element. Accordingly, AIMOD implementations utilizing a dual absorber, dual gap approach can increase color gamut and improve color saturation of the primary colors compared to IMODs with a single absorber, single gap architecture. Although the implementations of display elements having two absorbing layers and two gaps disclosed herein are described as being analog interferometric modulators, such features can also be incorporated in implementations of bi-stable interferometric modulator display elements, or display elements having reflectors that can be moved to multiple discrete positions.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and a gap defined between the absorber and the reflector. The reflector can be moved to two or more different positions, which can change the size of the gap and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the gap. One way of changing the gap is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form a resonant cavity or a gap (also sometimes referred to as an optical cavity or an optical gap). At least a portion of the gap between the fixed partially reflective layer and the movable reflector layer includes an air gap. The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective. In one example, the optical stack 16 may be fabricated by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
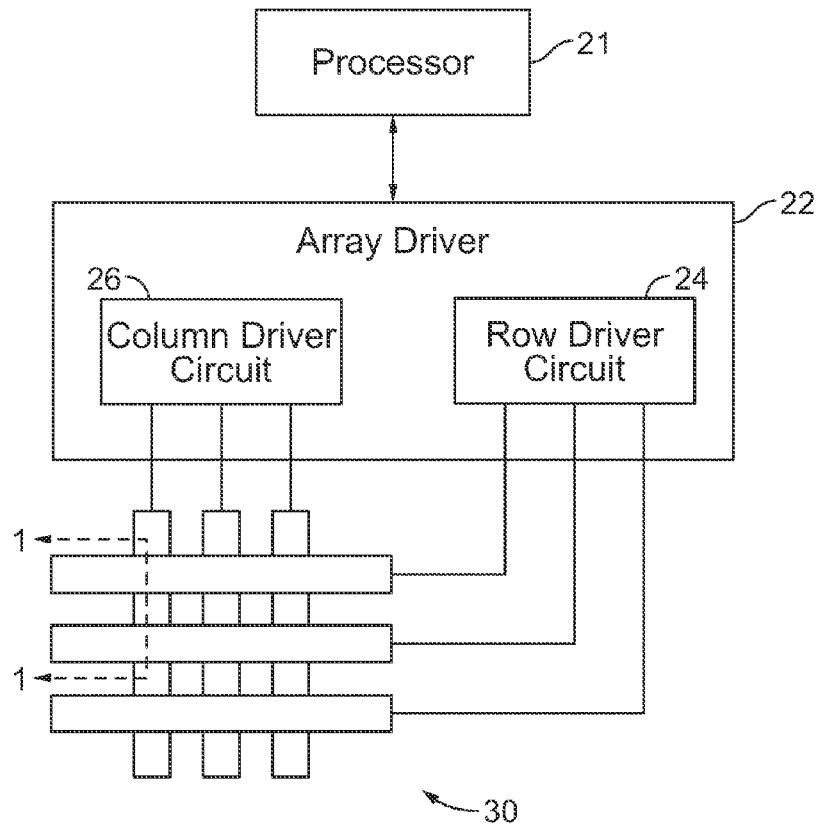
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
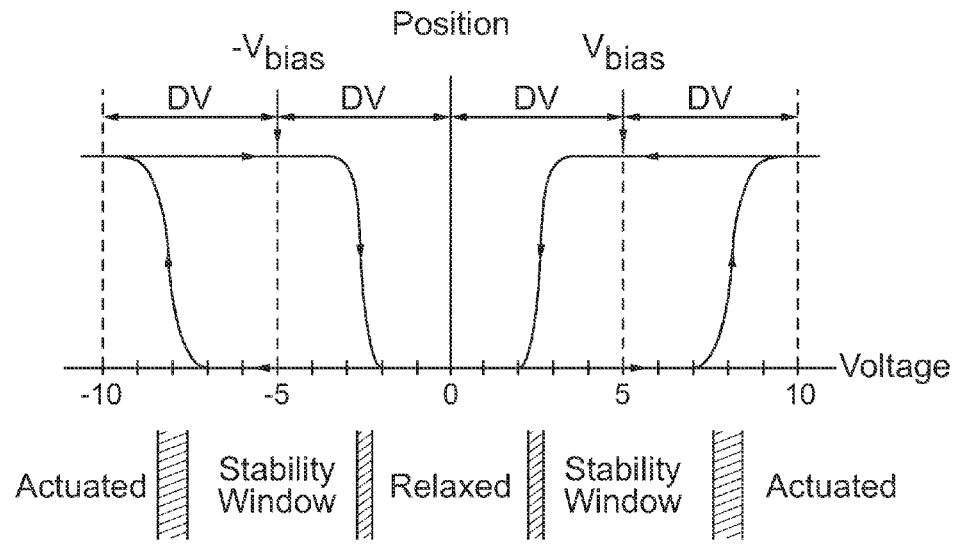
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
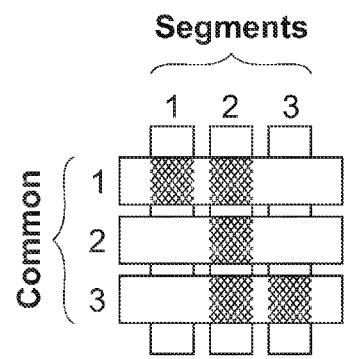
FIG. 5A shows an example of a diagram illustrating a frame of display data in the 3×3 interferometric modulator display of FIG. 2.
Figure 5B:
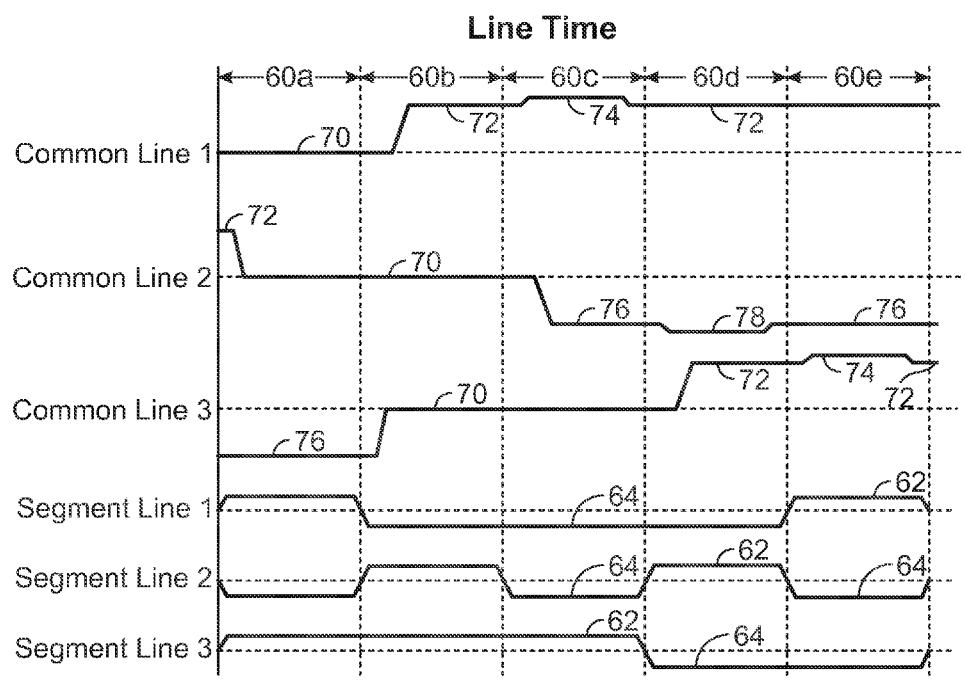
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$–relax and $VC_{HOLD\_L}$–stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
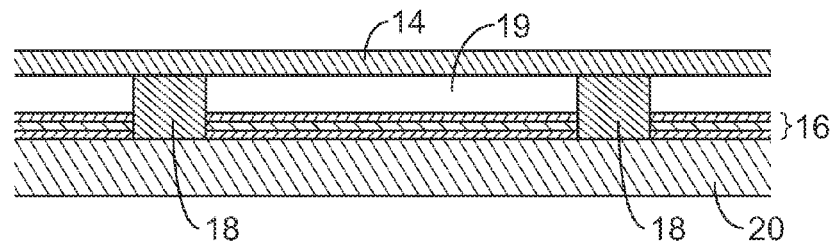
FIG. 6A shows an example of a partial cross-section of the interferometric modulator display of FIG. 1.
Figure 6B:
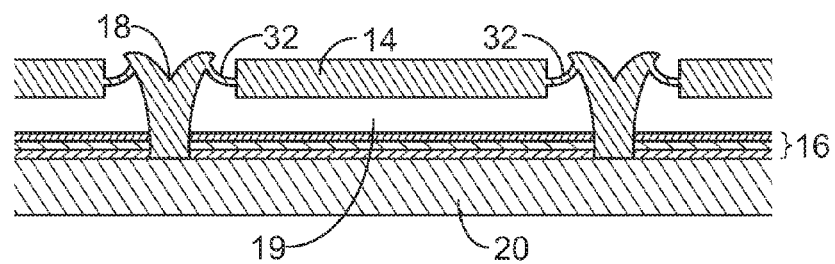
FIGS. 6B-6E show examples of cross-sections of varying implementations of interferometric modulators.
Figure 6C:
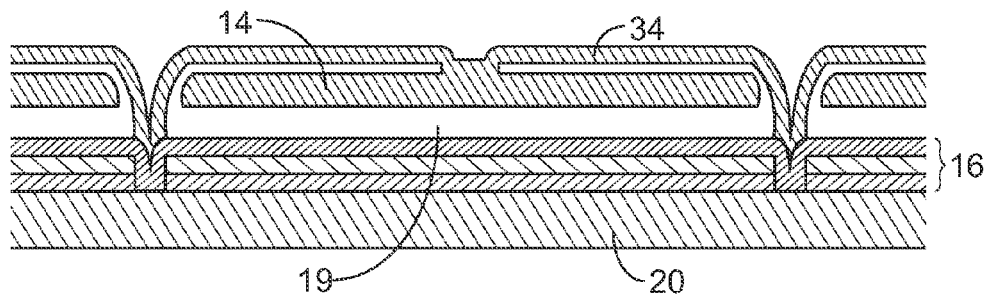

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
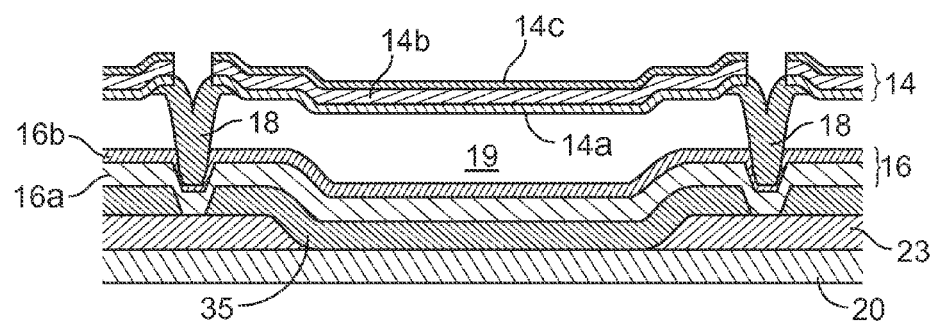

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (such as between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
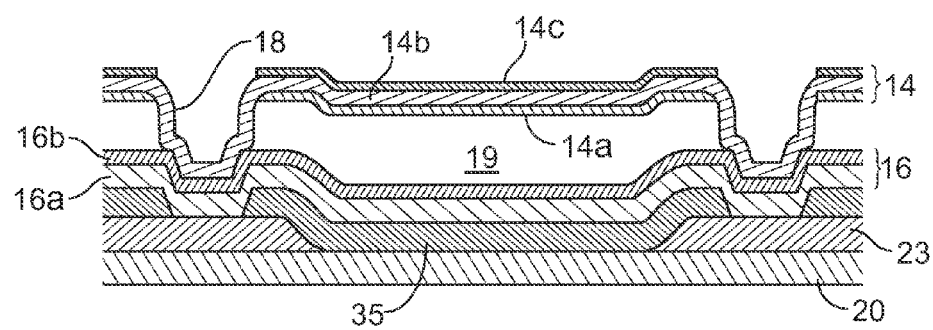

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, for example, patterning.

Figure 7:
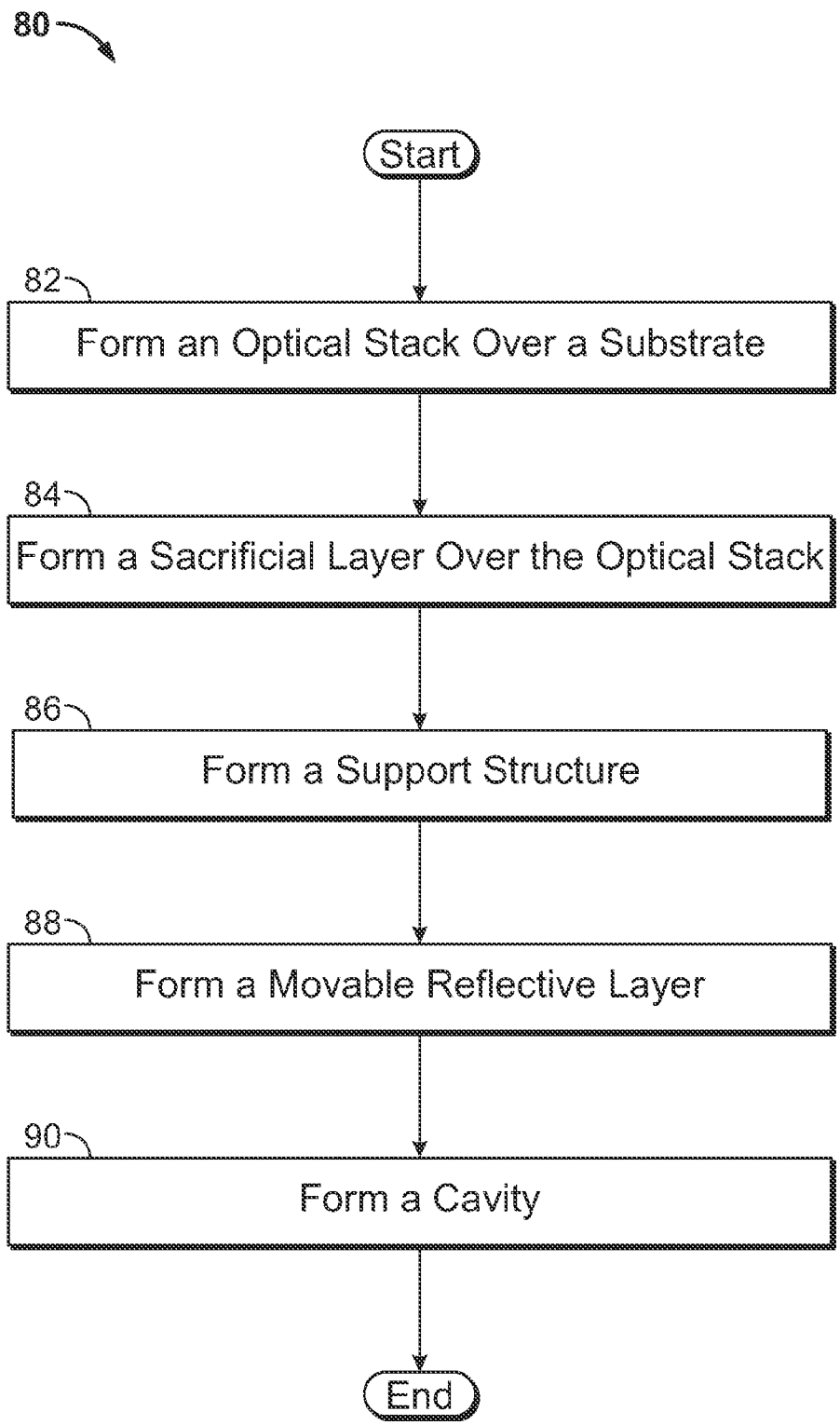
FIG. 7 shows an example of a flow diagram illustrating a manufacturing process for an interferometric modulator.
Figure 8A:
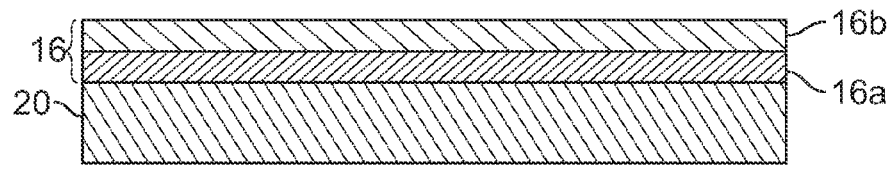
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device such as interferometric modulators of the general type illustrated in FIGS. 1 and 6. The manufacture of an electromechanical systems device can also include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display. It is noted that FIGS. 8A-8E may not be drawn to scale. For example, in some implementations, one of the sub-layers of the optical stack, the optically absorptive layer, may be very thin, although sub-layers 16a, 16b are shown somewhat thick in FIGS. 8A-8E.

Figure 8B:
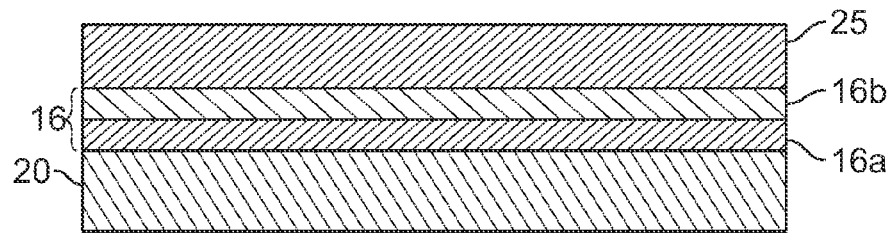

The process 80 continues at block 84 with the formation of a sacrificial layer 25 over the optical stack 16. The sacrificial layer 25 is later removed (see block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 8C:
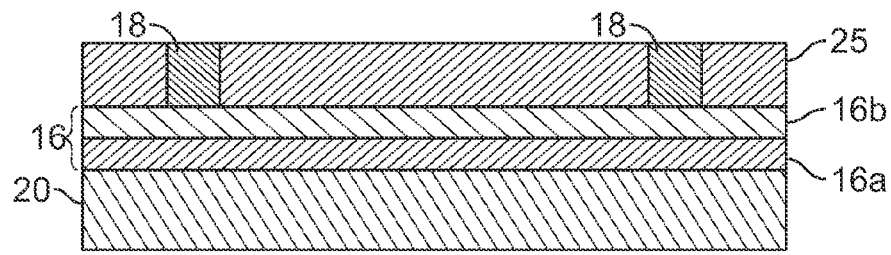

The process 80 continues at block 86 with the formation of a support structure such as post 18, illustrated in FIGS. 1, 6 and 8C. The formation of the post 18 may include patterning the sacrificial layer 25 to form a support structure aperture, then depositing a material (such as a polymer or an inorganic material such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
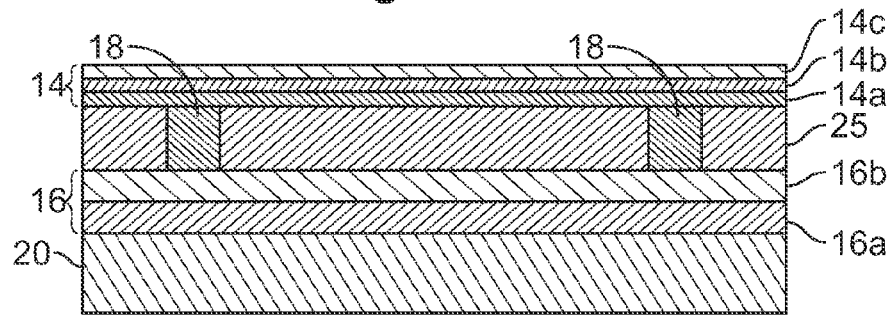
Figure 8E:
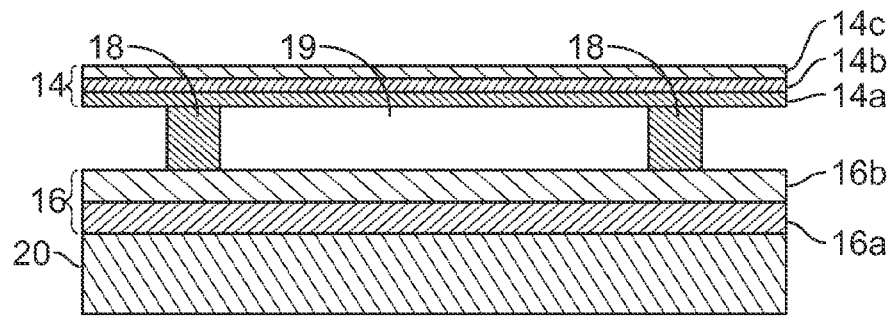

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps including, for example, reflective layer (such as aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, such as cavity 19 illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, by exposing the sacrificial layer 25 to a gaseous or vaporous etchant, such as vapors derived from solid $XeF_2$, for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Another implementation of an electromechanical interferometric modulator is referred to as an analog interferometric modulator, or AIMOD. Many of the features described above relating to bistable IMOD devices are also applicable to AIMODs. However, instead of being a bi-stable device having a movable reflective layer that is positionable in two positions, the movable reflective layer of an AIMOD can be positioned in multiple positions such that the AIMOD can reflect light of many colors, including black or a dark state, based on the position of the movable reflective layer relative to an absorbing layer.

Figure 9:
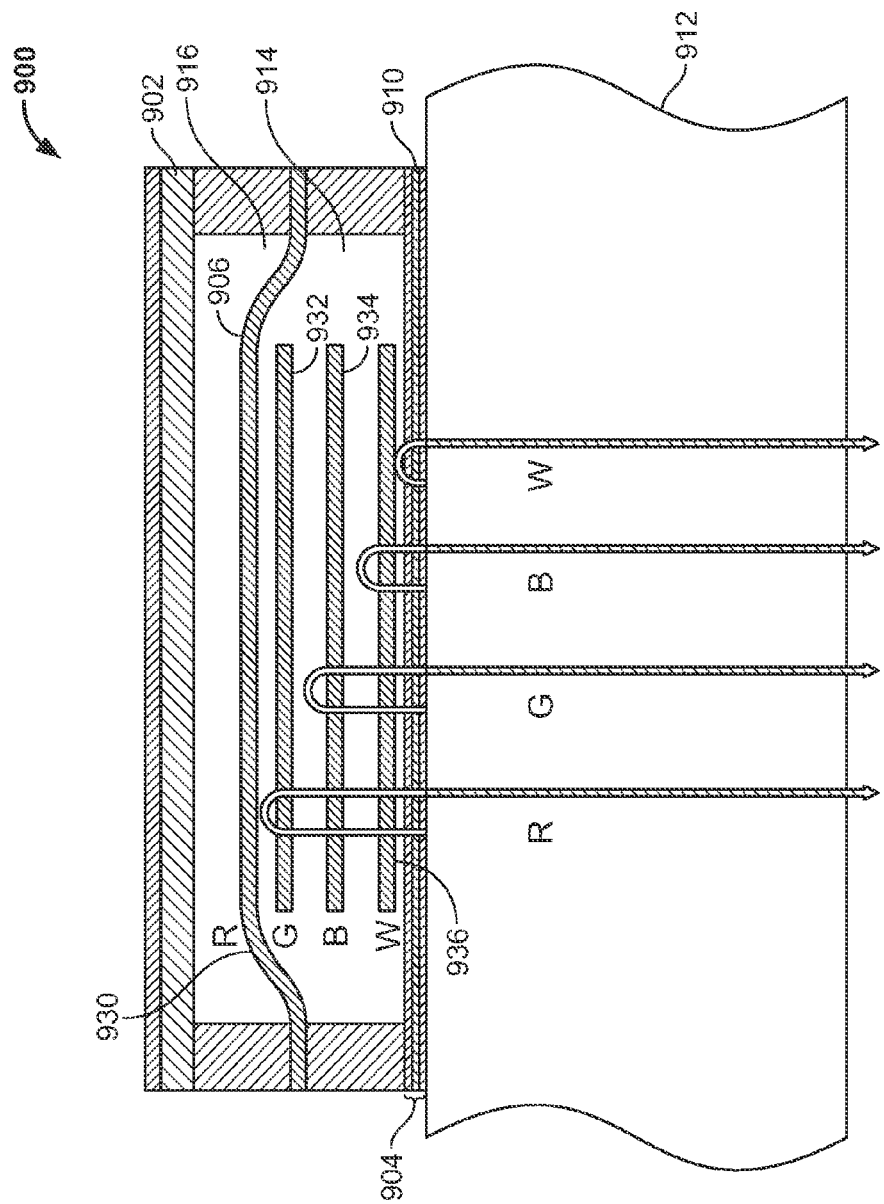
FIG. 9 shows an example of a cross-section of an analog interferometric modulator (AIMOD).

FIG. 9 shows an example of a cross-section of an AIMOD 900. The AIMOD 900 includes a substrate 912 and an optical stack 904 disposed over the substrate 912. The AIMOD 900 also includes a movable reflective layer 906 disposed between a first electrode 910 and a second electrode 902. In some implementations, the optical stack 904 includes an absorbing layer, and/or a plurality of other layers, and can be configured similar to the optical stack 16 illustrated in FIGS. 1, 6A-6E. In some implementations, and in the example illustrated in FIG. 9, the optical stack 904 includes the first electrode 910 which is configured as an absorbing layer. In some implementations, the absorbing layer first electrode 910 can be a 6 nm layer of material that includes MoCr.

Still referring to FIG. 9, the reflective layer 906 can be provided with a charge. The reflective layer is configured to, once charged, move toward either the first electrode 910 or the second electrode 902 when a voltage is applied between the first and second electrodes 910 and 902. In this manner, the reflective layer 906 can be driven through a range of positions between the two electrodes 902 and 910, including above and below a relaxed (unactuated) state. For example, FIG. 9 illustrates the reflective layer 906 can be moved to various positions 930, 932, 934, and 936 between the upper electrode 902 and the lower electrode 910.

The AIMOD 900 can be configured to selectively reflect certain wavelengths of light depending on the configuration of the modulator. The distance between the lower electrode 910, which in this implementation acts as an absorbing layer, and the reflective layer 906 changes the reflective properties of the AIMOD 900. Any particular wavelength is maximally reflected from the AIMOD 900 when the distance between the reflective layer 906 and the absorbing layer first electrode 910 is such that the absorbing layer (first electrode 910) is located at the minimum light intensity of standing waves resulting from interference between incident light and light reflected from the reflective layer 906. For example, as illustrated, the AIMOD 900 is designed to be viewed on the substrate 912 side of the modulator (through the substrate 912). Light enters the AIMOD 900 through the substrate 912. Depending on the position of the reflective layer 906, different wavelengths of light are reflected back through the substrate 912, which gives the appearance of different colors. These different colors are also known as native colors. A position of a movable layer(s) of a display element (e.g., an interferometric modulator) at a location such that it reflects a certain wavelength or wavelengths can be referred to a display state. For example, when the reflective layer 906 is in position 930, red wavelengths of light are reflected in greater proportion than other wavelengths and the other wavelengths of light are absorbed in greater proportion than red. Accordingly, the AIMOD 900 appears red and is said to be in a red display state, or simply a red state. Similarly, the AIMOD 900 is in a green display state (or green state) when the reflective layer 906 moves to position 932, where green wavelengths of light are reflected in greater proportion than other wavelengths and the other wavelengths of light are absorbed in greater proportion than green. When the reflective layer 906 moves to position 934, the AIMOD 900 is in a blue display state (or blue state) and blue wavelengths of light are reflected in greater proportion than other wavelengths and the other wavelengths of light are absorbed in greater proportion than blue. When the reflective layer 906 moves to a position 936, the AIMOD 900 is in a white display state (or white state) and a broad range of wavelengths of light in the visible spectrum are substantially reflected such that and the AIMOD 900 appears "white" or in some cases "silver", or in some cases tinted with blue, green or yellow, depending on the exact position of 936. It should be noted that one of ordinary skill in the art will recognize that the AIMOD 900 can take on different states and selectively reflect other wavelengths of light based on the position of the reflective layer 906, and also based on materials that are used in construction of the AIMOD 900, particularly various layers in the 904.

The AIMOD 900 in FIG. 9 has two structural gaps, a first gap 914 between the reflective layer 906 and the optical stack 904, and a second gap 916 between the reflective layer 906 and the second electrode 902. However, because the reflective layer 906 is reflective and not transmissive, light does not propagate through the reflective layer 906 into the second gap 916. In other words, the second gap provides space allowing reflective layer 906 to move but the gap itself has no optical effect. In addition, the color and/or intensity of light reflected by the interferometric modulator 906 is determined by the distance between the reflective layer 906 and the absorbing layer (first electrode 910). Accordingly, the AIMOD 900 illustrated in FIG. 9 has one interferometric gap 914. In contrast, FIGS. 10-23 illustrate features of AIMODs having two gaps and two absorbing layers.

In an IMOD display element, the display element's reflective color is determined by the gap spacing between a thin absorbing metal layer and a mirror surface. In an ideal configuration, when the absorbing layer is positioned at a minimum field intensity of one primary color (e.g., red), the absorbing layer ought to be simultaneously positioned at the location of a maximum field intensity of the other two primary colors (e.g., green and blue). In such a configuration, the absorbing layer minimally absorbs red light reflected from the mirror surface while absorbing a maximum amount of green and blue light. However, in less than ideal configurations, the absorption of green and blue light may not be sufficiently high because the minimum field intensity of one primary color does not spatially overlap with a sufficient high field intensity of the other primary colors. This can result in less than ideal color saturation of the desired reflected color of light. In other words, the main reason for less-than-ideal saturation of a desired reflected color is that the "valley" of one primary color interference standing wave field intensity does not spatially overlap enough with the maximum field intensity of other primary colors. When this occurs, the mix of the leaked color due to insufficient absorption broadens the spectrum. Increasing an absorbing layer from its optimum thickness causes impedance mismatch, resulting in spurious reflection from the absorber and consequently poor contrast, poor color saturation and reduced brightness and color gamut. Accordingly, desired absorption loss of the non-preferred color is insufficient, resulting in a reflection color spectrum that is broader than desired for the IMOD display element when the absorber layer is positioned to produce a desired color (e.g., red, green, or blue) light, which results in unsaturated display colors. With a single absorber, it is difficult to achieve good color saturation even with sophisticated multistack optical thin film coatings. An analog interferometric modulator device including two gap structures and two absorber layers can improve color saturation when compared to a device with only a single absorber layer.

Figure 10:
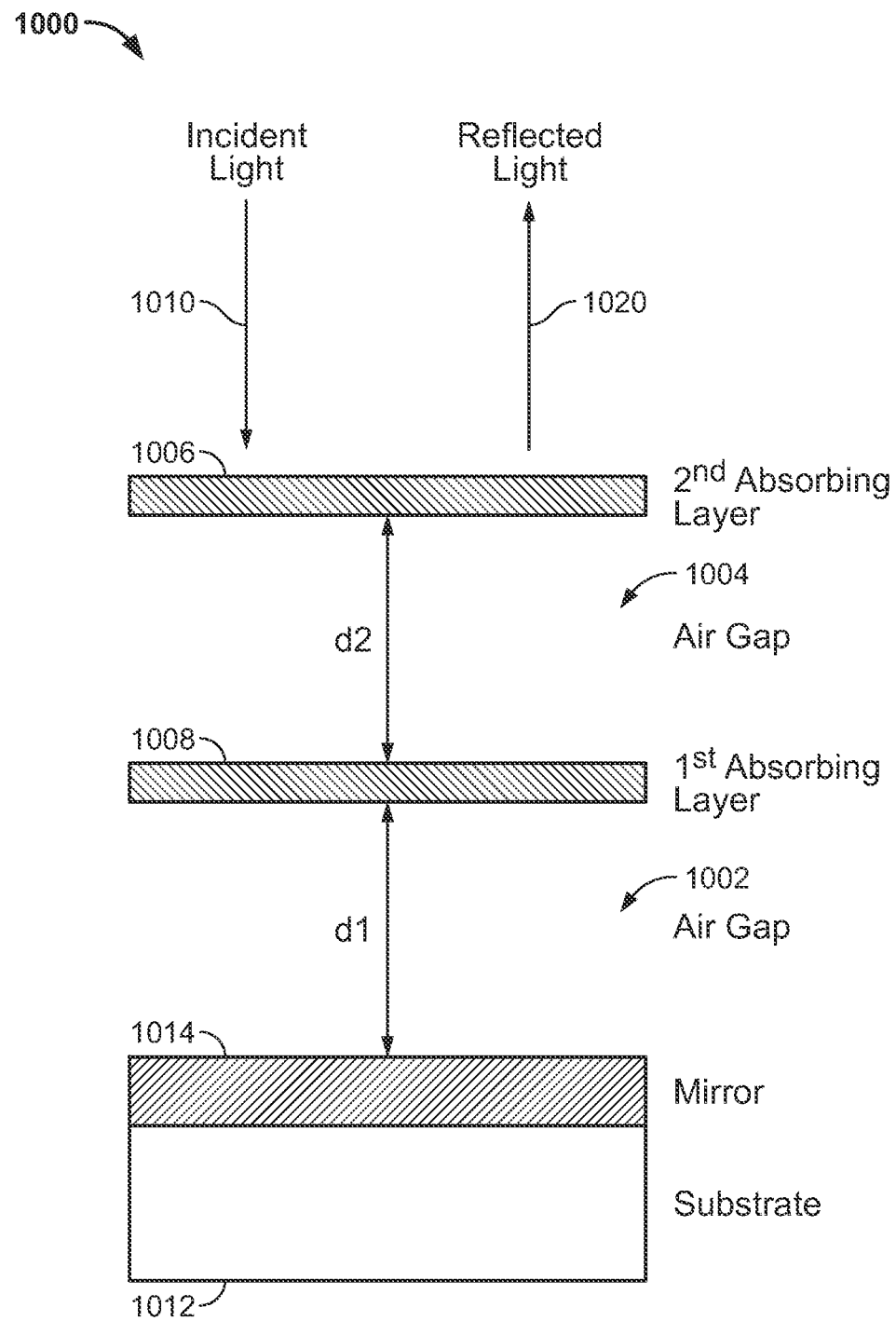
FIG. 10 shows an example of a cross-sectional schematic illustration of an analog interferometric modulator having two variable gaps and two absorber layers.

FIG. 10 shows an example of a cross-sectional schematic illustration of an AIMOD 1000 that has two variable gaps and two absorber layers. In some implementations, AIMOD 1000 includes a reflective surface or mirror 1014 disposed on a substrate 1012. The mirror 1014 can be an optically reflective surface such that the reflected light 1020 from the AIMOD can be, for example, light having a wavelength(s) in the range of visible light, for example, between about 400 nm and about 750 nm. The substrate can be transparent, semi-transparent, or non-transparent because the AIMOD 1000 is not configured to receive incident light through the substrate in this implementation. The AIMOD 1000 also includes a movable first absorbing layer 1008 disposed such that the mirror 1014 is between the first absorbing layer 1008 and the substrate 1012. The first absorbing layer 1008 is configured to be separated from the mirror 1014 by a variable interferometric first gap 1002 having a variable gap height dimension of distance d1. The position of the first absorbing layer 1008 relative to the mirror 1014 defines the distance d1 and defines wavelengths of light that are absorbed by the first absorbing layer 1008, as previously described in reference to the AIMOD illustrated in FIG. 9. In some implementations, the first absorbing layer includes a layer of MoCr that has a thickness dimension in an active area of the AIMOD of between about 4 nm and about 6 nm. In some implementations, the first absorbing layer 1008 can be non-reflective or substantially non-reflective.

Still referring to the implementation illustrated in FIG. 10, the AIMOD 1000 also includes a movable second absorbing layer 1006 separated from the first absorbing layer 1008 and disposed such that first absorbing layer 1008 is between the mirror 1014 and the second absorbing layer 1006. The second absorbing layer 1006 is configured to be separated from the first absorbing layer 1008 by an interferometric absorbing second gap 1004 having a variable gap height dimension of distance d2. The position of the second absorbing layer 1006 relative to the mirror 1014 is defined by distance d1+d2, and this distance (d1+d2) plus light penetration depth in the mirror 1014 correspondingly defines wavelengths of light that are absorbed by the second absorbing layer 1008. The first and second absorbing layers 1008 and 1006 are partially reflective and partially transmissive. In some implementations of any of the dual gap AIMODS described herein or other display devices, the second absorbing layer 1006 can be non-reflective or substantially non-reflective such that either one or both of the first and second absorbing layers 1008 and 1006 can be non-reflective or substantially non-reflective. Also, the first and/or second absorbing layers of any of the dual gap AIMODS described herein can be configured as electrodes and used to drive movable layers of the AIMOD, for example as described in reference to FIGS. 19 and 20.

In some implementations, the AIMOD 1000 is configured such that the relationship between distances d1 and d2 is fixed even as distances d1 and d2 change. In some implementations, certain fixed relationships between distances d1 and d2 can optimize color gamut and ensure good saturation at the primary color settings. In some implementations, distances d1 and d2 are different by the amount of the light penetration depth into the mirror 1014 when no dielectric layers are fabricated on the mirror 1014 and on the first and second absorbing layers 1008 and 1006. When there are dielectric layers on the mirror 1014 and/or the first and second absorber layers 1008 and 1006, the first and second absorbing layer 1008 and 1006 can be positioned such that the distances d1 and d2 of the first and second gaps 1002 and 1004, respectively, can take into account the optical thickness of the dielectric layers such that the desired color is reflected from the interferometric modulator 1000. In some implementations, the two absorbing layers 1006 and 1008 move synchronously keeping the fixed distance relationship to produce the desired color.

In some implementations of an AIMOD that includes two gaps and two absorbing layers, the thickness of the first absorbing layer 1008 can be configured to be thicker than the second absorbing layer 1006. This arrangement is effective to improve color saturation because the first absorber deals with lower order colors that are less dispersive spatially than the higher order colors where the second absorber located. Lower order peaks of standing waves of different colors are closer in space and can be more effectively absorbed with a thicker absorber. In some implementations, the sum of the thickness of the first and second absorbing layers 1008 and 1006 is about twice the thickness of a single absorbing layer in an AIMOD that only has one gap. For example, in one implementation of an AIMOD with one gap, where the single absorbing layer includes MoCr, and with no dielectric layers included within the first gap, the thickness for a single absorbing layer AIMOD can be about 3 nm. In some implementations for an AIMOD having two gaps (such as AIMOD of FIG. 10), the thicknesses of the first absorbing layer and second absorbing layer and are about 4.5 nm and about 1.5 nm, respectively. In some implementations of an AIMOD having two gaps, for example, the AIMODs described herein, the first absorbing layer can include a suitable light absorbing material (such as MoCr) and be configured to be between about 2 nm and 7 nm thick, and the second absorbing layer can also include a suitable light absorbing material (such as MoCr) and be configured to be between about 0.5 nm and about 4 nm thick. The mirror 1014 reflects a broadband spectrum of the incident ambient light back which interferes with the incident light to form a standing wave. The first absorbing layer 1008 and the second absorbing layer 1006 each absorb certain wavelengths of light based on the distance d1 between the first absorbing layer 1008 and the mirror 1014 and the distance d1+d2 between the second absorbing layer 1006 and the mirror 1014. Positioning the first and second absorbing layers 1008 and 1006 with respect to the mirror 1014 is further discussed below in reference to FIGS. 13-15. Accordingly, by utilizing a display element configuration having two gaps, an AIMOD can improve color saturation of a desired reflected primary color through increased absorption of non-desired colors while maintaining minimum absorption of the desired primary color. As discussed later in reference to FIG. 20, AIMODs can be fabricated similar to the fabrication processes described in reference to FIGS. 7 and 8A-8E but where two gaps are formed using two sacrificial layers.

Figure 11:
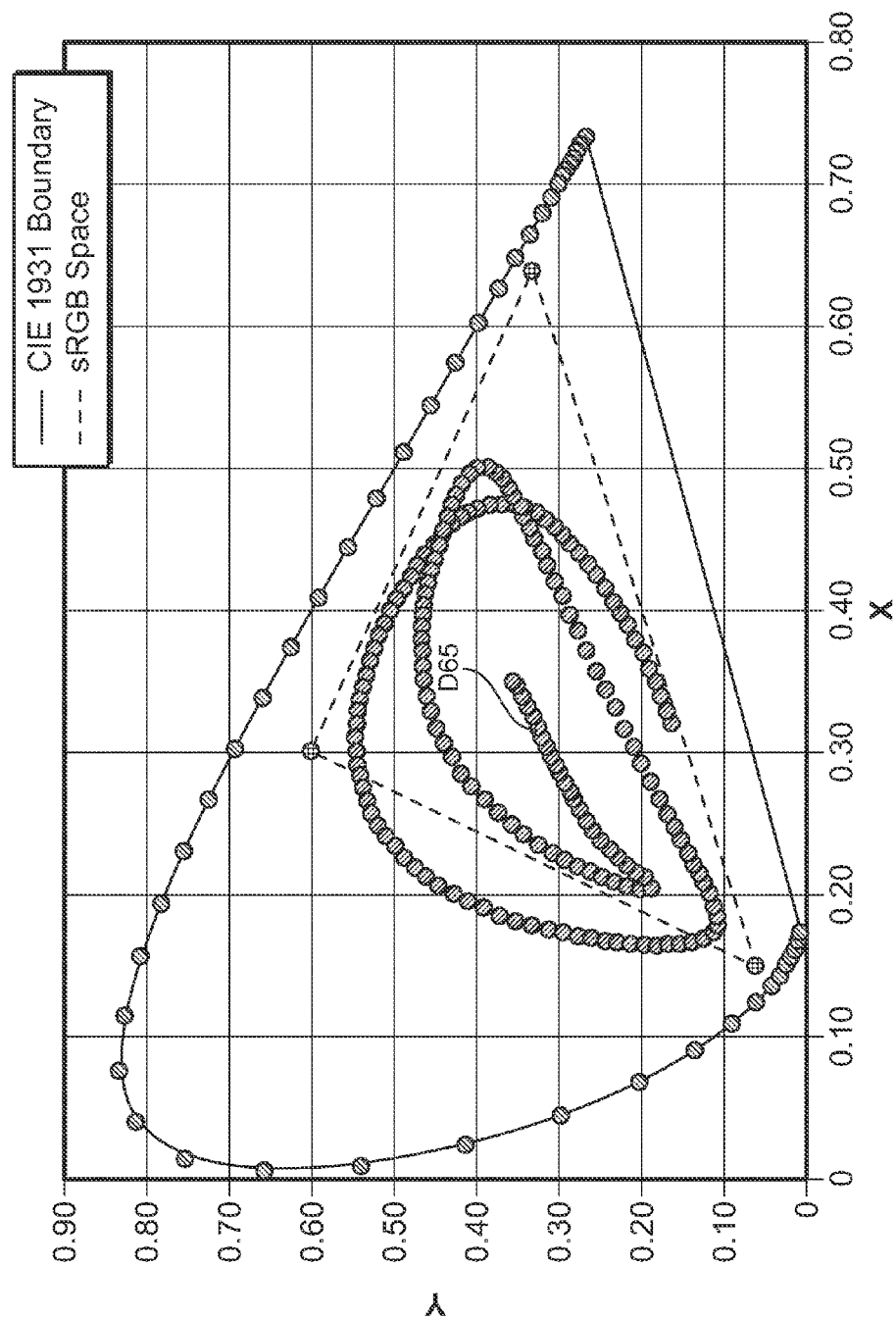
FIG. 11 illustrates a CIE 1931 color space chromaticity diagram and an overlying sRGB color space diagram of a simulated color palette produced by an implementation of an AIMOD having a single gap.
Figure 12:
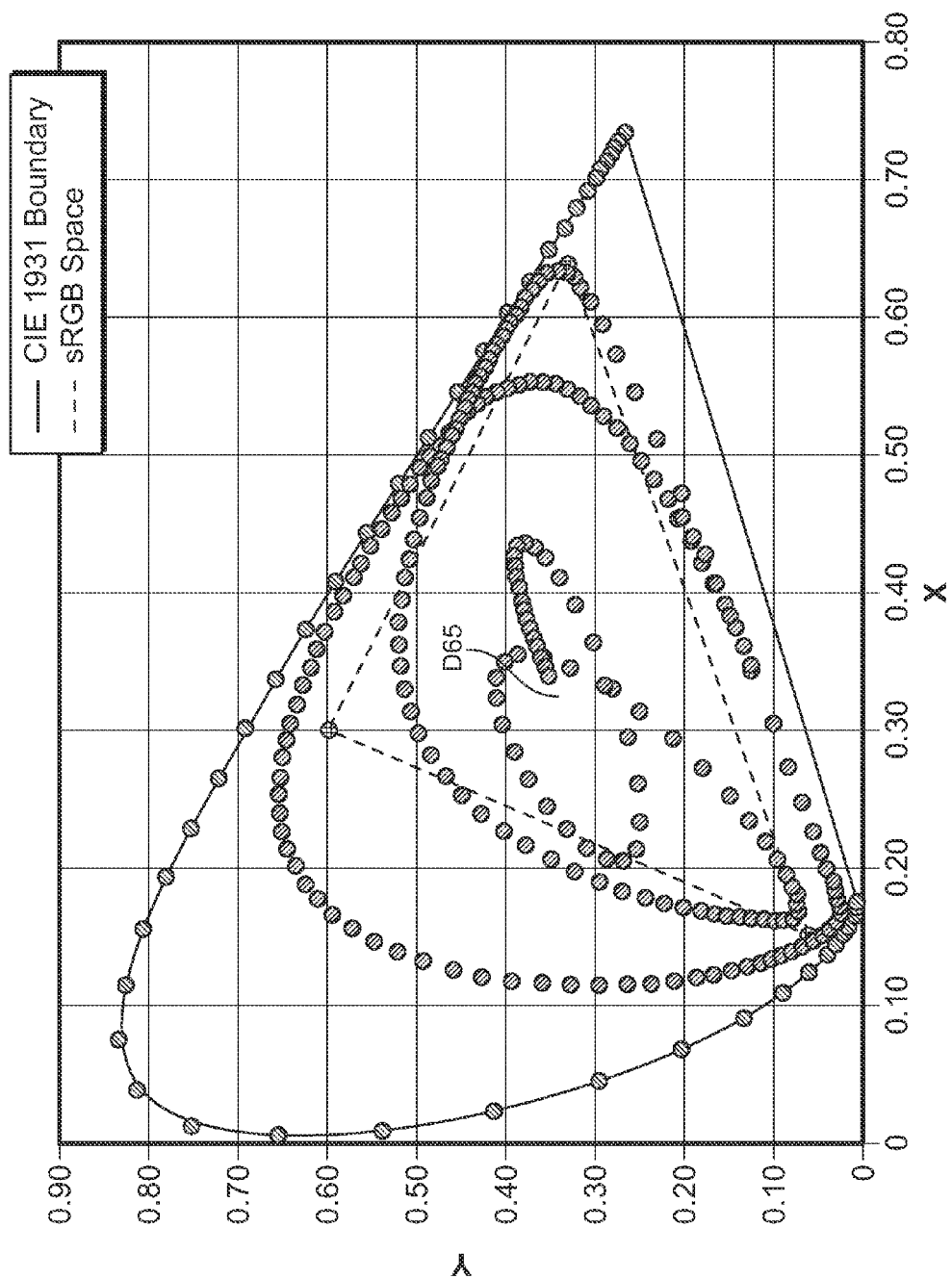
FIG. 12 illustrates a CIE 1931 color space chromaticity diagram and an overlying sRGB color space diagram of a simulated color palette produced by an implementation of an AIMOD having two absorber layers and two gaps.

FIGS. 11 and 12 illustrate simulated results for a single gap AIMOD and a double gap AIMOD for comparison. FIG. 11 illustrates a CIE 1931 color space chromaticity diagram and an overlying sRGB color space diagram of a simulated color palette produced by an implementation of an AIMOD having a single gap. D65 indicates a white point that is the CIE Standard Illuminant D65 correlate to 6504K color temperature. The diagram also includes an overlying gamut of sRGB color space. FIG. 12 illustrates a CIE 1931 color space chromaticity diagram and an overlying sRGB color space diagram of a simulated color palette produced by an implementation of an AIMOD having two absorber layers and two gaps. The diagram also includes an overlying gamut of sRGB color space. The color spirals illustrated in FIGS. 11 and 12 were simulated for air gap steps from 0 nm to 650 nm, where the air gap of the single gap AIMOD was equal to each of the two air gaps of the two gap AIMOD for this simulation. The simulated values illustrated in FIG. 12 cover a larger area of the CIE color space than do those values illustrated in FIG. 11. Accordingly, significant improvement in color gamut and color saturation in primary colors is shown in FIG. 12 for the AIMOD having the two gaps with two absorbers when compared to an AIMOD with only one gap and one absorber. FIGS. 11 and 12 show that an AIMOD having two gaps is capable of producing colors that correspond to wider range of values for both x and y chromaticity values. The wider range of x and y chromaticity values indicates that for a given broadband spectrum of incident light, a dual gap AIMOD can produce a wider range of saturated colors. Accordingly, using a dual gap, dual absorber design can increase color gamut and improve color saturation of the primary colors when compared to a single gap, single absorber design.

Figure 13:
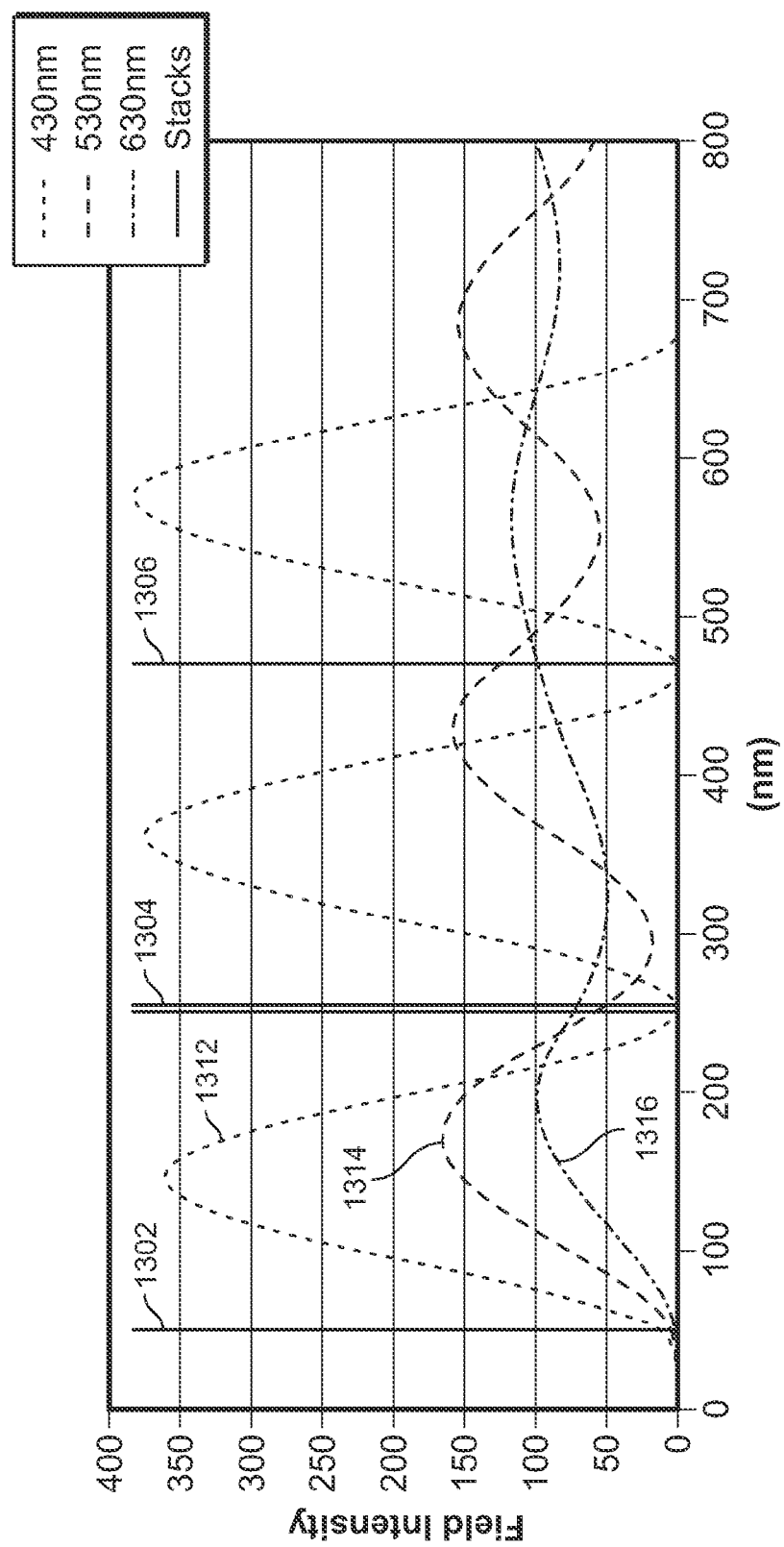
FIG. 13 is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects blue light.
Figure 14:
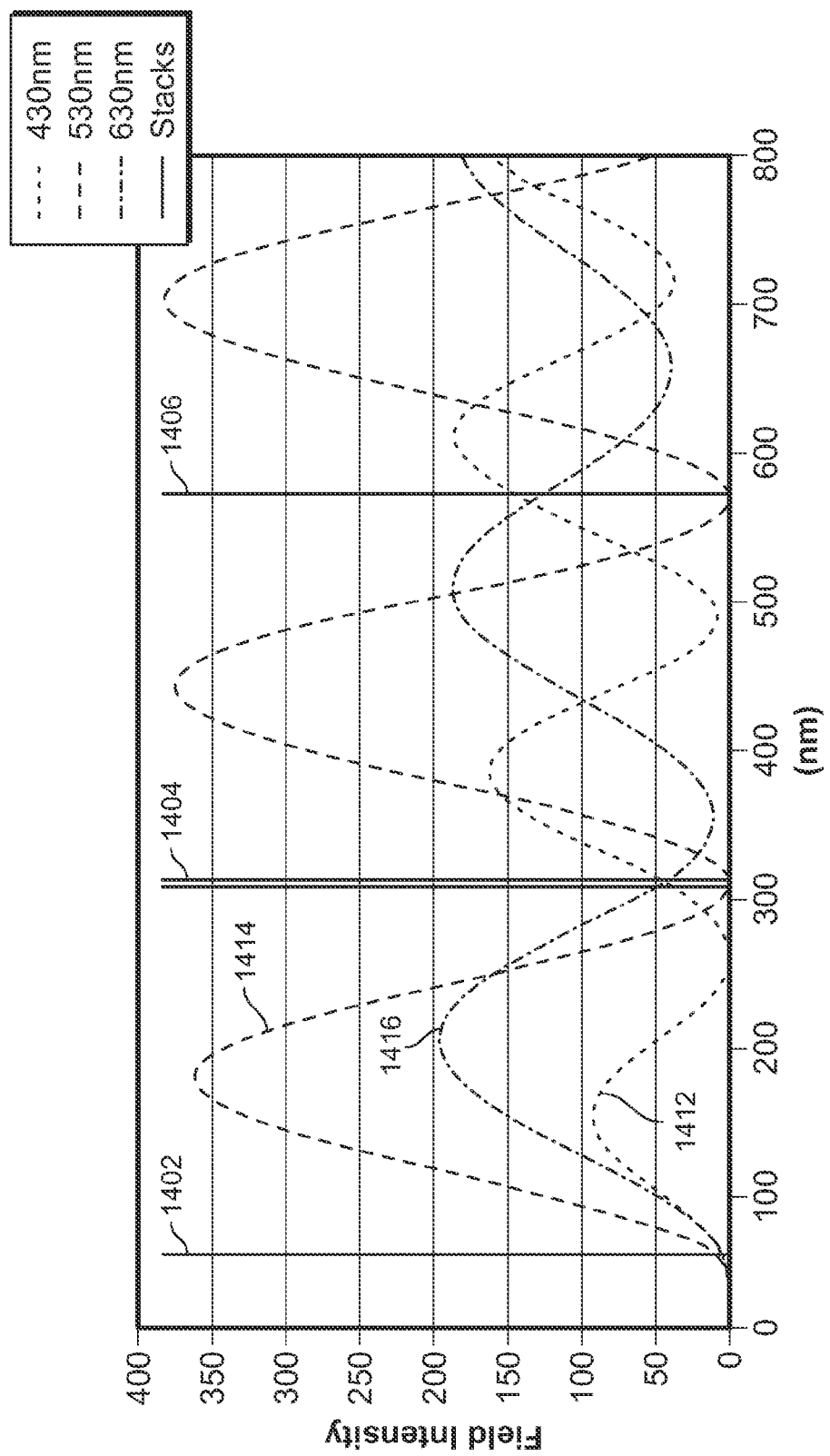
FIG. 14 is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects green light.
Figure 15A:
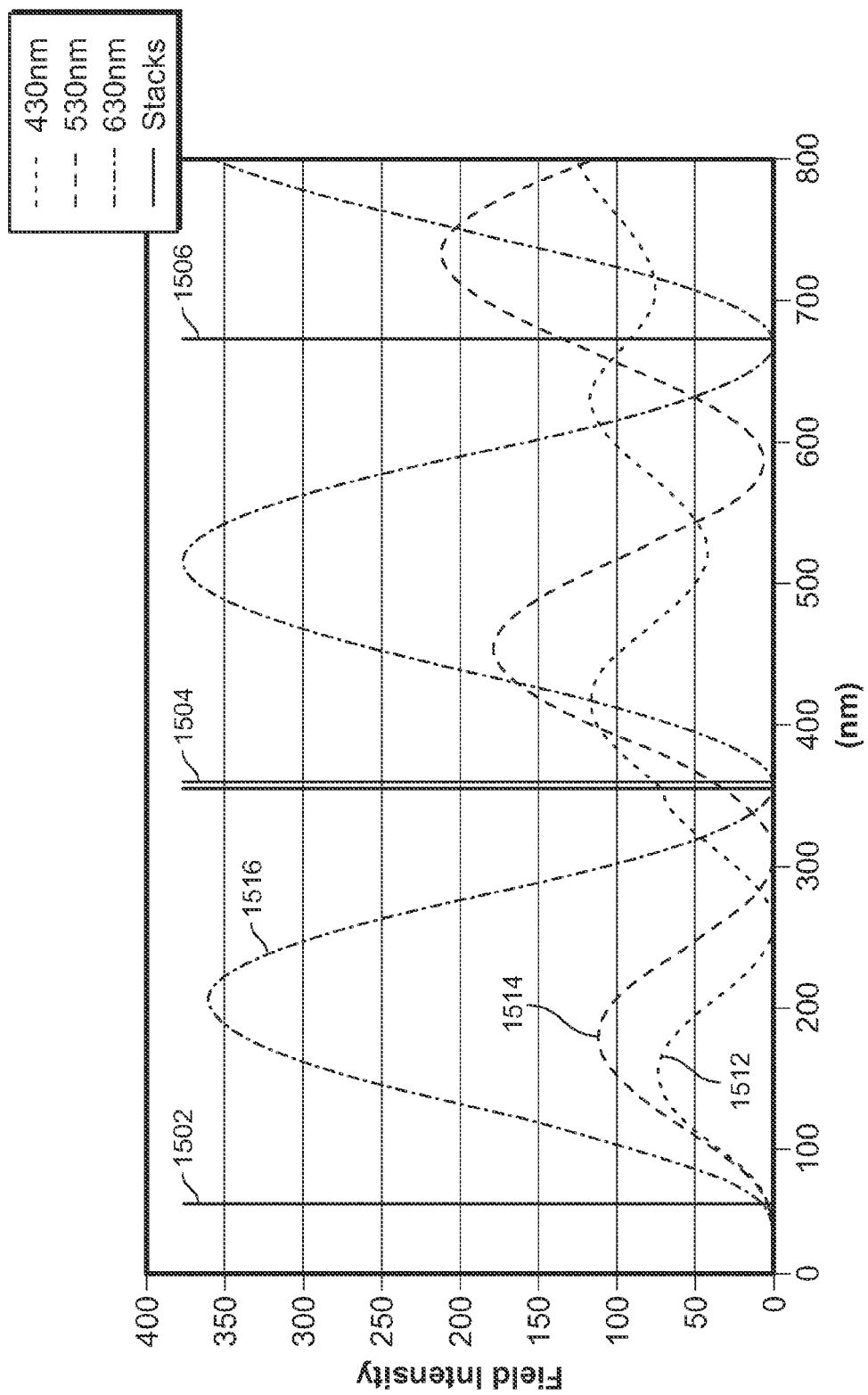
FIG. 15A is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects red light.
Figure 15B:
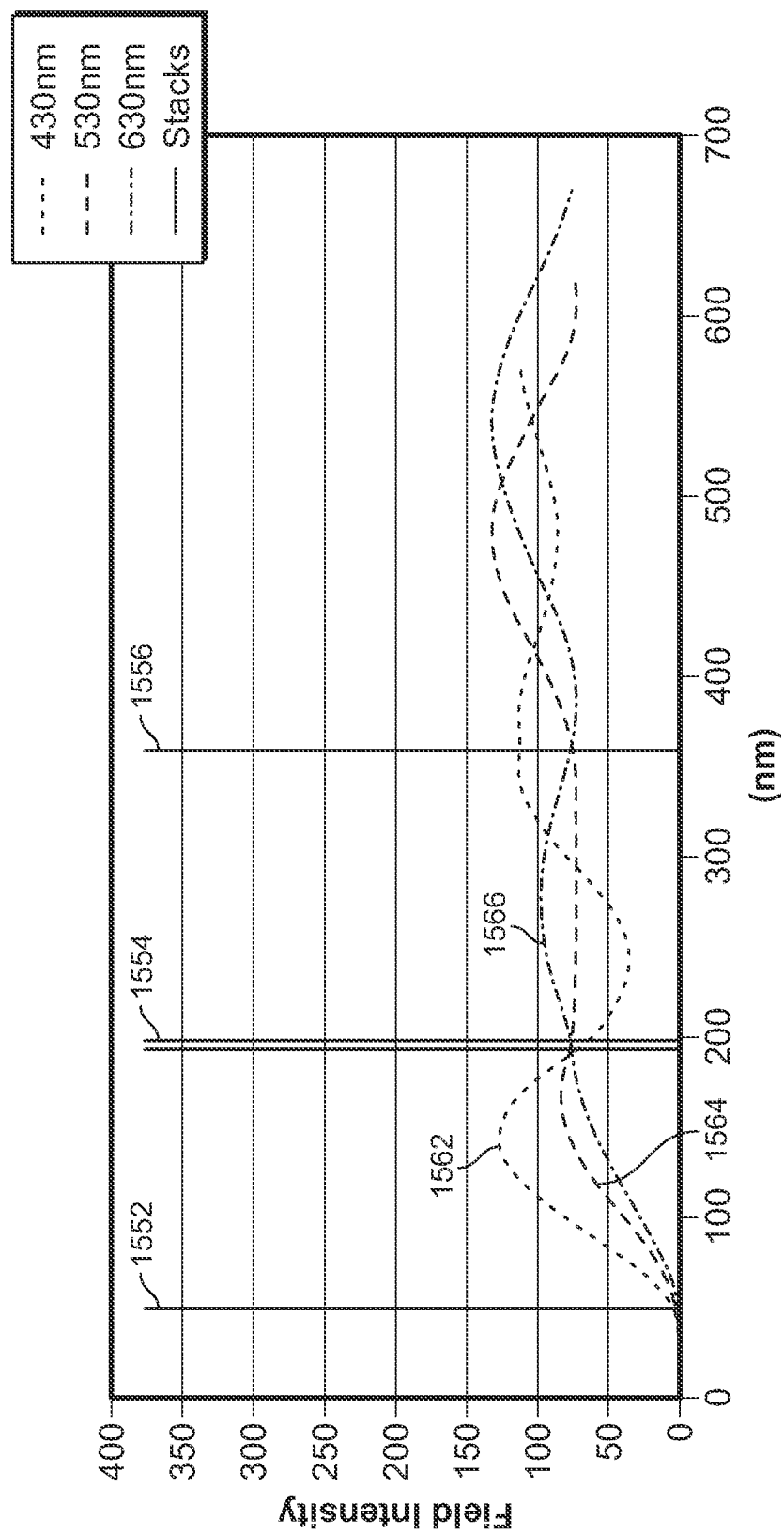
FIG. 15B is a graph of Distances of Two Absorber Layers from an AIMOD Mirror verses the Field Intensity for blue light (430 nm), green light (530 nm), and red light (630 nm) when the two absorber layers are positioned so that an AIMOD display element appears in a dark state, or black.

FIGS. 13-15A/B are graphs that illustrate the standing wave field intensities produces by a reflective AIMOD having two gaps, where two absorbing layers are positioned such that the AIMOD reflects blue (FIG. 13), green (FIG. 14), red (FIG. 15A) light, or appears dark or black (FIG. 15B)

FIG. 13 is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects blue light. In FIG. 13, the graph illustrates the position of the mirror surface 1302, and the positions of the first and second absorbing layers 1304 and 1306 respectively. In this example, the mirror thickness is 50 nm, the first absorber layer thickness is 4.5 nm, and the second absorber layer thickness is 1.5 nm. FIG. 13 also illustrates plots of the field intensities of blue light 1312, green light 1314, and red light 1316 that are reflected from the AIMOD mirror with the first and second absorbing layers positioned as shown. For example, the blue reflected light 1312 having a wavelength of 430 nm has a first minimum field intensity at about 250 nm (200 nm from the mirror surface) and a second minimum field intensity at 465 nm (415 nm from the mirror). The green reflected light 1314 having a wavelength of 530 nm has a first minimum field intensity node at about 300 nm from zero (250 nm from the mirror surface) and a second minimum field intensity node at about 565 nm (515 nm from the mirror surface). As illustrated in FIG. 13, the plots of the green field intensity 1314 and the red field intensity 1316 do not extend to a zero ("0") field intensity to indicate the light reflected from the mirror surface 1302 is much weaker than the incident light such that the interference between the two doesn't create full interference modulation. Red reflected light 1316 having a wavelength of 630 has a first minimum field intensity at 350 nm (300 nm from the mirror surface) and a second minimum field intensity at 665 nm (615 nm from the mirror surface). The first absorbing layer is positioned at the distance 1304 of the first minimum node of the blue light 1312, at 200 nm from the mirror surface. The second absorbing layer is positioned at the distance 1306 of the second minimum node of the blue light 1312, at 415 nm from the mirror surface. By placing the first and second absorbing layers at these positions, the wavelengths of the green and red light are not at a minimum node at these positions. Accordingly, the two absorbing layers absorb more of the green and red light and less blue light reflected from the mirror because the blue light is at a minimum node at the location of the two absorbing layers, while the green light and red light are not at a minimum node. With such a configuration, the resulting field intensity of the reflected blue light 1312 is greater than the field intensity of the reflected green or red light, such that light that is reflected from the AIMOD appears blue.

FIG. 14 is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects green light. This graph can be applicable for positioning the first and second absorbing layers 1008 and 1006 of the AIMOD 1000 illustrated in FIG. 10. In the graph illustrated in FIG. 14, the reflected blue light 1412, green light 1414, and red light 1416 are of the same wavelengths as described for FIG. 13. Accordingly, the blue light 1412 has a wavelength of 430 nm, a first minimum field intensity at about 200 nm from the mirror surface, and a second minimum field intensity at 415 nm from the mirror surface. Green light 1414 at a wavelength of 530 nm has first and second minimum field intensity nodes at about 250 nm and 515 nm, respectively, from the mirror surface. Red light 1416 at a wavelength of 630 nm has first and second minimum field intensity nodes at 300 nm and 615 nm, respectively, from the mirror surface. In FIG. 14, the first absorbing layer is positioned at a distance 1404 of 250 nm from the mirror surface location 1402, and the second absorbing layer is positioned at a distance 1406 of 515 nm from the mirror surface location 1402. Accordingly, the two absorbing layers absorb more of the blue and red light and less green light reflected from the mirror because the green light is at a minimum node at the location of the two absorbing layers, while the blue light and red light are not at a minimum node. With such a configuration, the resulting field intensity of the reflected green light 1414 is much greater than the field intensity of the reflected blue light 1412 or red light 1416, such that light reflected from the AIMOD appears green.

FIG. 15A is a graph of Distances of Two Absorber Layers from an AIMOD Mirror verses the Field Intensity for blue light (430 nm), green light (530 nm), and red light (630 nm) when the two absorber layers are positioned so that an AIMOD display element reflects red light. This graph can be applicable for positioning the first and second absorbing layers 1008 and 1006 of the AIMOD 1000 illustrated in FIG. 10. In the graph illustrated in FIG. 15A, the reflected blue light 1512, green light 1514, and red light 1516 are of the same wavelengths as described for FIG. 13. Accordingly, the blue light 1512 has a wavelength of 430 nm, a first minimum field intensity at about 200 nm from the mirror surface, and a second minimum field intensity at about 415 nm from the mirror surface. Green light 1514 at a wavelength of 530 nm has first and second minimum field intensity nodes at about 250 nm and 515 nm, respectively, from the mirror surface. Red light 1416 at a wavelength of 630 nm has first and second minimum field intensity nodes at about 300 nm and 615 nm, respectively, from the mirror surface. In FIG. 15, the first absorbing layer is positioned at a distance 1504 of 300 nm from the mirror surface location 1502, and the second absorbing layer is positioned at a distance 1406 of 615 nm from the mirror surface location 1502. Accordingly, the two absorbing layers absorb more of the blue and green light and less red light reflected from the mirror because the red light is at a minimum node at the location of the two absorbing layers, while the blue light and green light are not at a minimum node. With such a configuration, the resulting field intensity of the reflected green light 1414 is much greater than the field intensity of the reflected blue light 1412 or red light 1416, such that light reflected from the AIMOD appears green.

FIG. 15B is a graph of Distances of Two Absorber Layers from an AIMOD Mirror verses the Field Intensity for blue light (430 nm) 1562, green light (530 nm) 1564, and red light (630 nm) 1566 when the two absorber layers are positioned so that an AIMOD display element appears in a dark state, or black. In a dark state, an AIMOD reflects a minimum amount of light. In FIG. 15B, the first absorbing layer 1554 is positioned at a distance of 145 nm from the mirror surface location, and the second absorbing layer 1556 is positioned at a distance 305 nm from the mirror surface location 1552. Accordingly, the first and second absorbing layers 1554 and 1556 are located where the field intensity of the blue, green and red wavelengths is relatively high and hence relatively high absorption occurs to all the wavelengths, such that light reflected from AIMOD is very weak and the display appears black.

Figure 16:
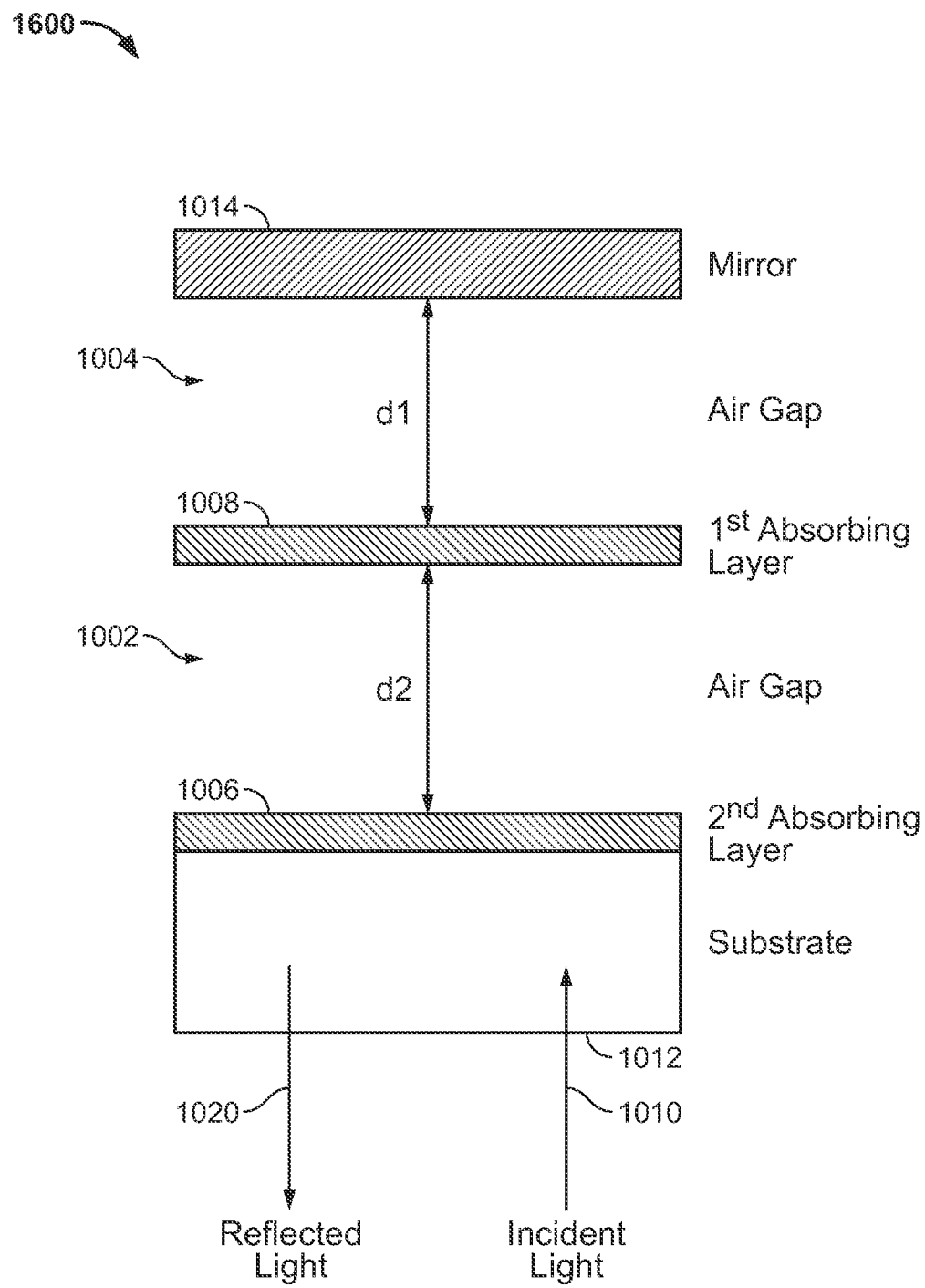
FIG. 16 shows an example of a cross-sectional schematic illustration of another implementation of an analog interferometric modulator 1600 that includes two variable height gaps.

FIG. 16 shows an example of a cross-sectional schematic illustration of another implementation of an AIMOD 1600 that includes two variable height gaps. In FIG. 16, AIMOD 1600 includes a movable reflective element or mirror 1014, a movable first absorbing layer 1008, and a first gap 1004. At least part of the first gap 1004 can include an air gap. The first gap 1004 is configured to have a variable height dimension d1 in the active area of the AIMOD which changes when the first absorbing layer 1008 and/or the mirror 1014 are synchronously driven to different positions. In some implementations, the mechanical strength of the first absorbing layer 1008 can be enhanced by including a dielectric layer (such as $SiO_2$) disposed on the first absorbing layer 1008, for example, as illustrated in the implementations of FIGS. 17 and 18.

Still referring to FIG. 16, the AIMOD 1600 also includes a stationary second absorbing layer 1006 which is disposed on a substrate 1012, and a second gap 1002 disposed between the second absorbing layer 1006 and the first absorbing layer 1008. The second gap 1002 is configured to have a variable height dimension d2 in the active area of the display, which can change when the first absorbing layer 1008 is driven to various positions to change the reflection spectrum of the AIMOD 1600. In this implementation, incident ambient light 1010 is received through the substrate 1012. The received light can propagate through the second absorbing layer 1006 and through the first absorbing layer 1008 to the mirror 1014. The operation of the two gaps for AIMOD 1600 are similar as the AIMOD 1000 illustrated in FIG. 10, and the optical principles are the same as described in reference to FIGS. 9-15. However, in this implementation, the second absorbing layer 1006 is stationary, and the mirror 1014 and the first absorbing layer 1008 are movable and are driven to various positions to correspondingly change the gap height dimensions d1 and d2 of the first and second gap, respectively, so that the AIMOD 1600 reflects light of a desired color. Accordingly, depending at least in part on the nature of the incident light and the height dimensions d1 and d2 of the first and second gaps 1004 and 1002, respectively, a portion of the light reflected by the mirror 1014 is absorbed by the first absorbing layer 1008 and the second absorbing layer 1006, and wavelengths of light that are not absorbed are emitted from the AIMOD 1600 as the reflected light 1020. While FIG. 16 and the corresponding description disclose a display element that includes two variable gaps, implementations of the disclosed structure where the gaps are not variable are also contemplated.

Figure 17:
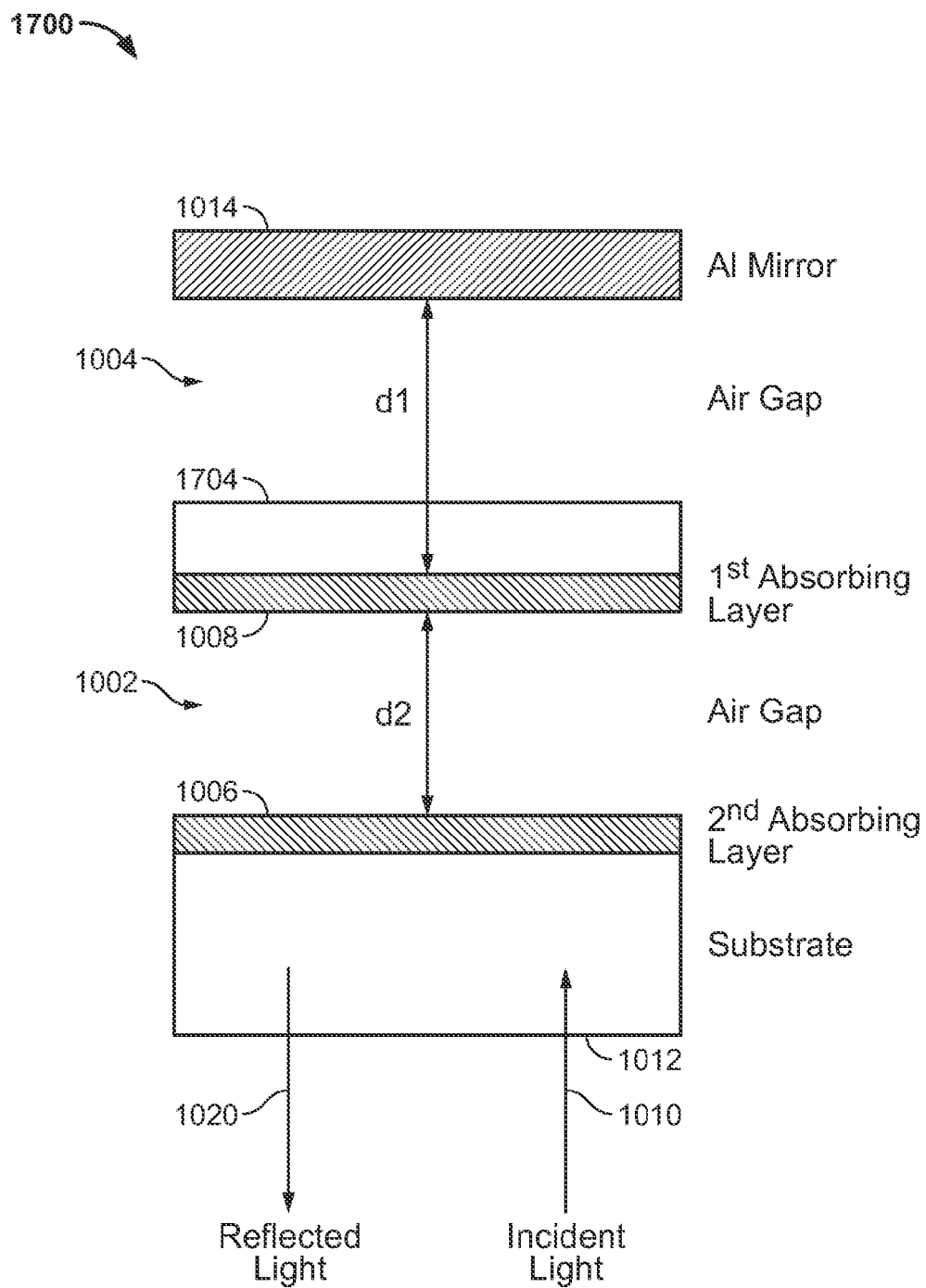
FIG. 17 shows an example of a cross-sectional schematic illustration of another implementation of an analog interferometric modulator that also has two variable height gaps.
Figure 18:
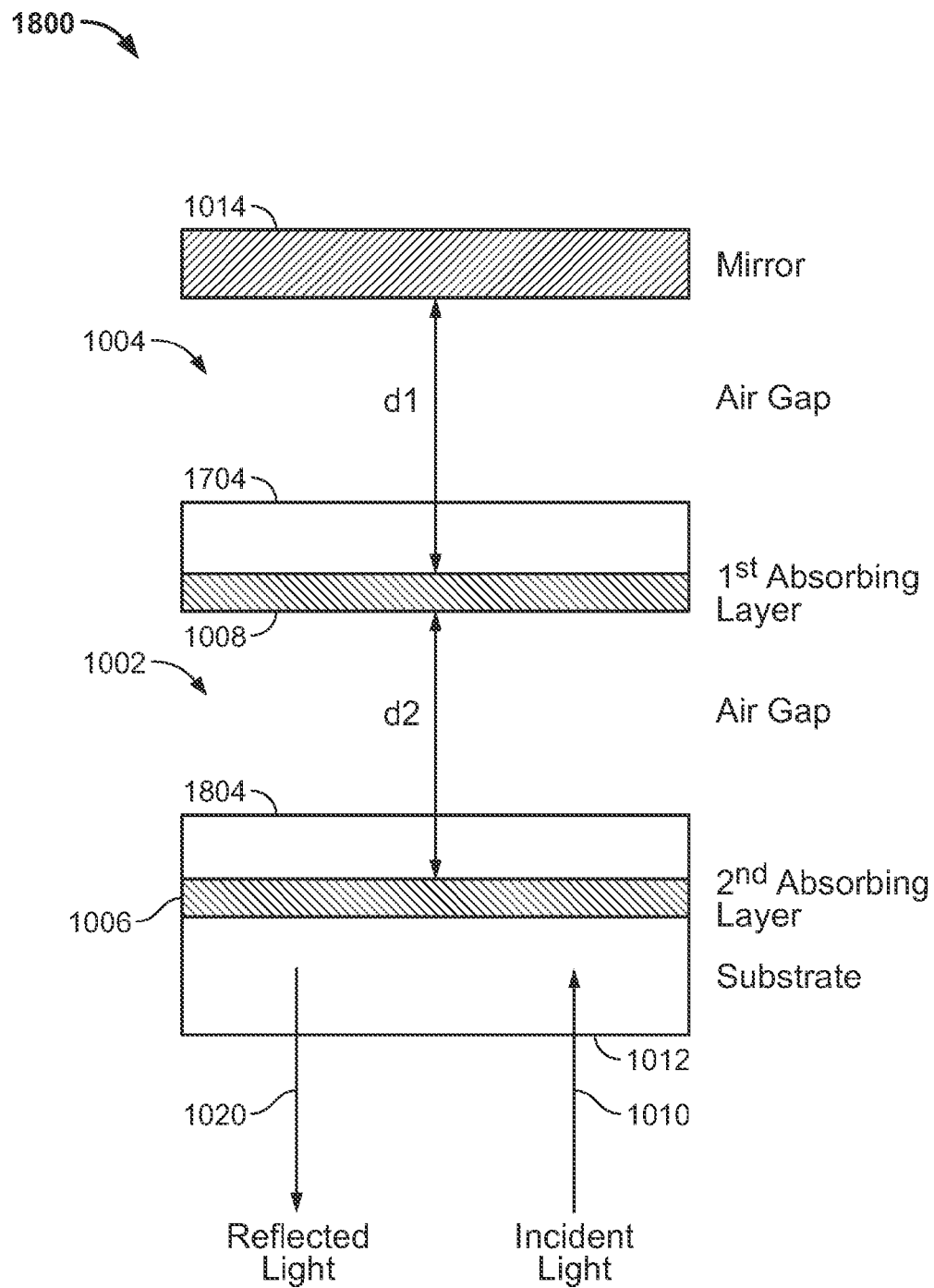
FIG. 18 shows an example of a cross-sectional schematic illustration of another implementation of an analog interferometric modulator 1800 that includes two variable height gaps.

FIGS. 17 and 18 illustrate two implementations where a movable absorber layer is fabricated on a mechanical supporting dielectric layer. FIG. 17 shows an example of a cross-sectional schematic illustration of another implementation of an AIMOD 1700 that includes two variable height gaps. In FIG. 17, AIMOD 1700 includes a movable reflective element or mirror 1014, a movable first absorbing layer 1008, and a first gap 1004. The first gap 1004 is defined as the distance between the mirror 1014 and first absorbing layer 1008. At least part of the first gap 1004 can include an air gap. The first gap 1004 is configured to have a variable height dimension d1 which changes when the first absorbing layer 1008 and the mirror 1014 are moved to different positions. In the implementation of FIGS. 17 and 18, the distance d1 is related to d1', where d1' is the optical distance between the first absorbing layer 1008 and the mirror 1014. The optical distance d1' takes into account the thickness and index of refraction of a dielectric layer 1704, and the penetration depth of light into the mirror 1014. Also, the distance d2 is related to d2', where d2' is the optical distance between the first absorbing layer 1008 and the second absorbing layer 1006. The optical distance d2' takes into account the thickness and index of refraction of a dielectric layer 1804. The AIMOD 1700 also includes a stationary second absorbing layer 1006 which is disposed on a substrate 1012, and a second gap 1002 disposed between the second absorbing layer 1006 and the first absorbing layer 1008. The second gap 1002 is configured to have a variable height dimension d2, which can change when the first absorbing layer 1008 is driven to various positions to change the reflection spectrum of the AIMOD 1700. In some implementations, the first and second absorbing layers 1008 and 1006 can have various thickness dimensions as described herein. For example, the first absorbing layer can have a thickness dimension in an active area of the AIMOD 1700 of about 4.5 nm and the second absorbing layer can have a thickness dimension of about 1.5 nm in the active area of the AIMOD 1700.

In the implementation illustrated in FIG. 17, the AIMOD 1700 further includes a dielectric layer 1704 disposed on the first absorbing layer 1008 and between the first absorbing layer 1008 and the mirror 1014, within the first gap 1004. In some implementations, a dielectric layer (not shown) can be disposed on the mirror 1014 for structural support. Such a dielectric layer can provide structural support similar to support layer 14b in the implementations illustrated in FIGS. 6D and 8D. Having the dielectric layer 1704 adds mechanical strength to the relatively thinner first absorbing layer 1008. In another implementation (not shown), a dielectric layer can be disposed on the first absorbing layer 1008 and between the first absorbing layer 1008 and the second absorbing layer 1006 such that it is in the second gap 1002. In some implementations, the dielectric layer can include $SiO_2$. Such a dielectric layer can be configured to have a thickness dimension of between about 80 nm and about 250 nm in various implementations, for example, 170 nm, at least in the active area of the AIMOD 1700.

FIG. 18 shows an example of a cross-sectional schematic illustration of another implementation of an AIMOD 1800 that includes two variable height gaps. In FIG. 18, AIMOD 1800 includes a movable reflective element or mirror 1014, a movable first absorbing layer 1008, and a first gap 1004. At least part of the first gap 1004 can include an air gap. The first gap 1004 is configured to have a variable height dimension d1 which changes when the first absorbing layer 1008 and the mirror 1014 are moved to different positions, for example, when the first absorbing layer 1008 and the mirror 1014 are synchronously driven to different locations relative each other. The AIMOD 1800 also includes a stationary second absorbing layer 1006 which is disposed on a substrate 1012, and a second gap 1002 disposed between the second absorbing layer 1006 and the first absorbing layer 1008. The second gap 1002 is configured to have a variable height dimension d2, which can change when the first absorbing layer 1008 is driven to various positions to change the reflection spectrum of the AIMOD 1800. In some implementations, the first and second absorbing layers 1008 and 1006 can have various thickness dimensions as described herein. For example, the first absorbing layer can have a thickness dimension in an active area of the AIMOD 1800 of about 4.5 nm and the second absorbing layer can have a thickness dimension of about 1.5 nm in the active area of the AIMOD 1800.

In the implementation illustrated in FIG. 18, the AIMOD 1800 further includes a dielectric layer 1704 disposed on the first absorbing layer 1008 and between the first absorbing layer 1008 and the mirror 1014, within the first gap 1004. In another implementation (not shown), a dielectric layer can be disposed on the first absorbing layer 1008 and between the first absorbing layer 1008 and the second absorbing layer 1006 such that it is in the second gap 1002. The AIMOD 1800 also includes a second dielectric layer 1804 disposed on the second absorbing layer, such that the second dielectric layer 1804 is between the second absorbing layer 1006 and the first absorbing layer 1008. In some implementations, such dielectric layers can be configured to have a thickness dimension of between about 80 nm and about 250 nm, for example, 170 nm, at least in the active area of the AIMOD 1800. Although red color saturation can be diminished in an AIMOD that includes the relatively thick dielectric layers disposed with the absorbing layers as illustrated in FIGS. 17 and 18, the resulting red AIMOD still can have better saturation with the two gap configurations than a single gap configuration. In addition, such configurations allow multilayer dielectric high/low refractive index material pairs to be included on the absorber layer for color enhancement of light reflected from the mirror 1014. While FIGS. 17 and 18, and the corresponding description, disclose a display element that includes two variable gaps, implementations of the disclosed structure where the gaps are not variable but have two absorber layers positioned such that the display element provides light of certain wavelengths are also contemplated. Such static implementations can include first and second gaps 1002 and 1004 that are not filled by air, but are rather filled by a dielectric, such as $SiO_2$.

Figure 19:
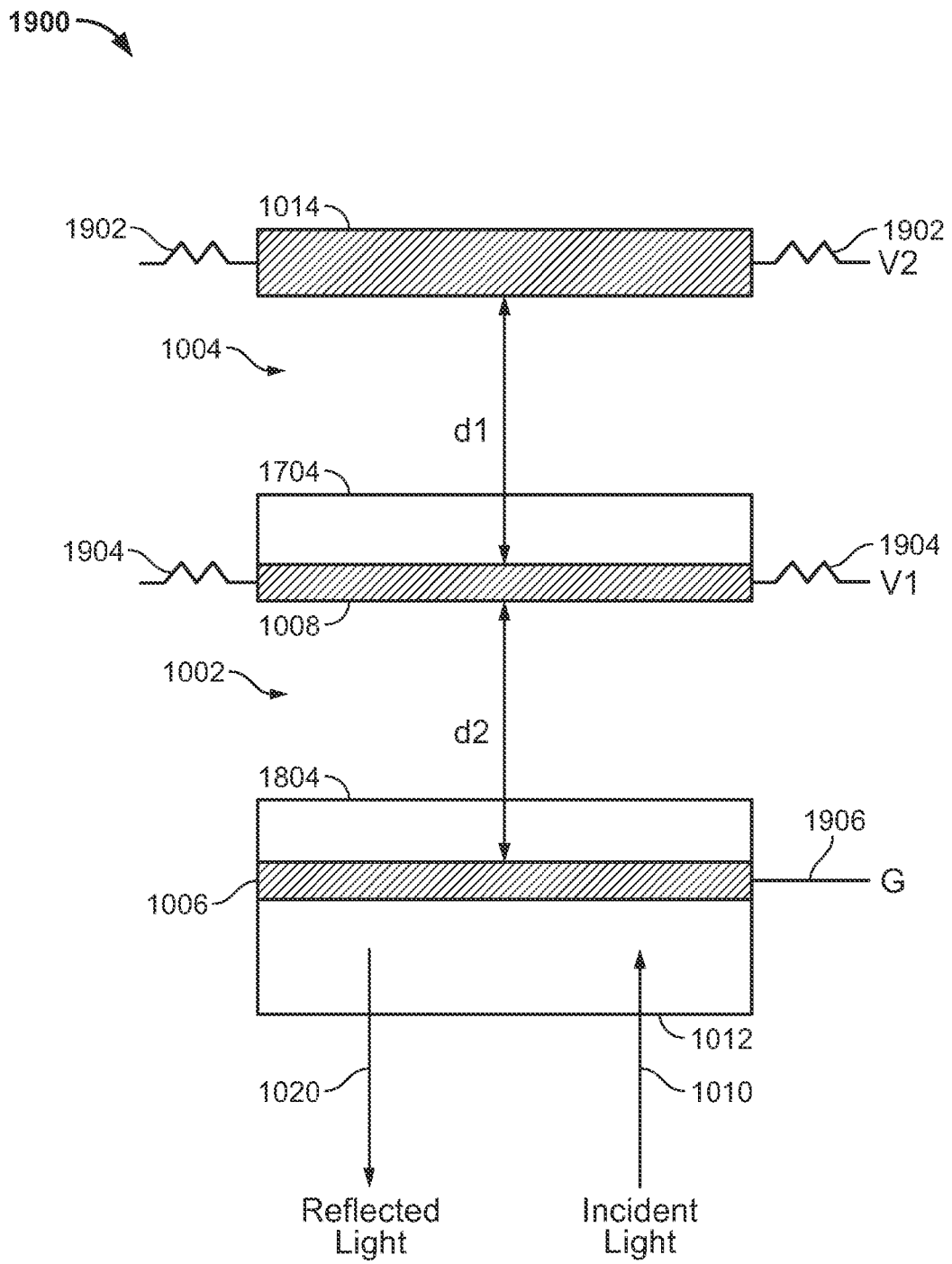
FIG. 19 shows an example of a cross-sectional schematic illustration of an analog interferometric modulator having two gaps and an implementation for changing the height of the gaps.
Figure 20:
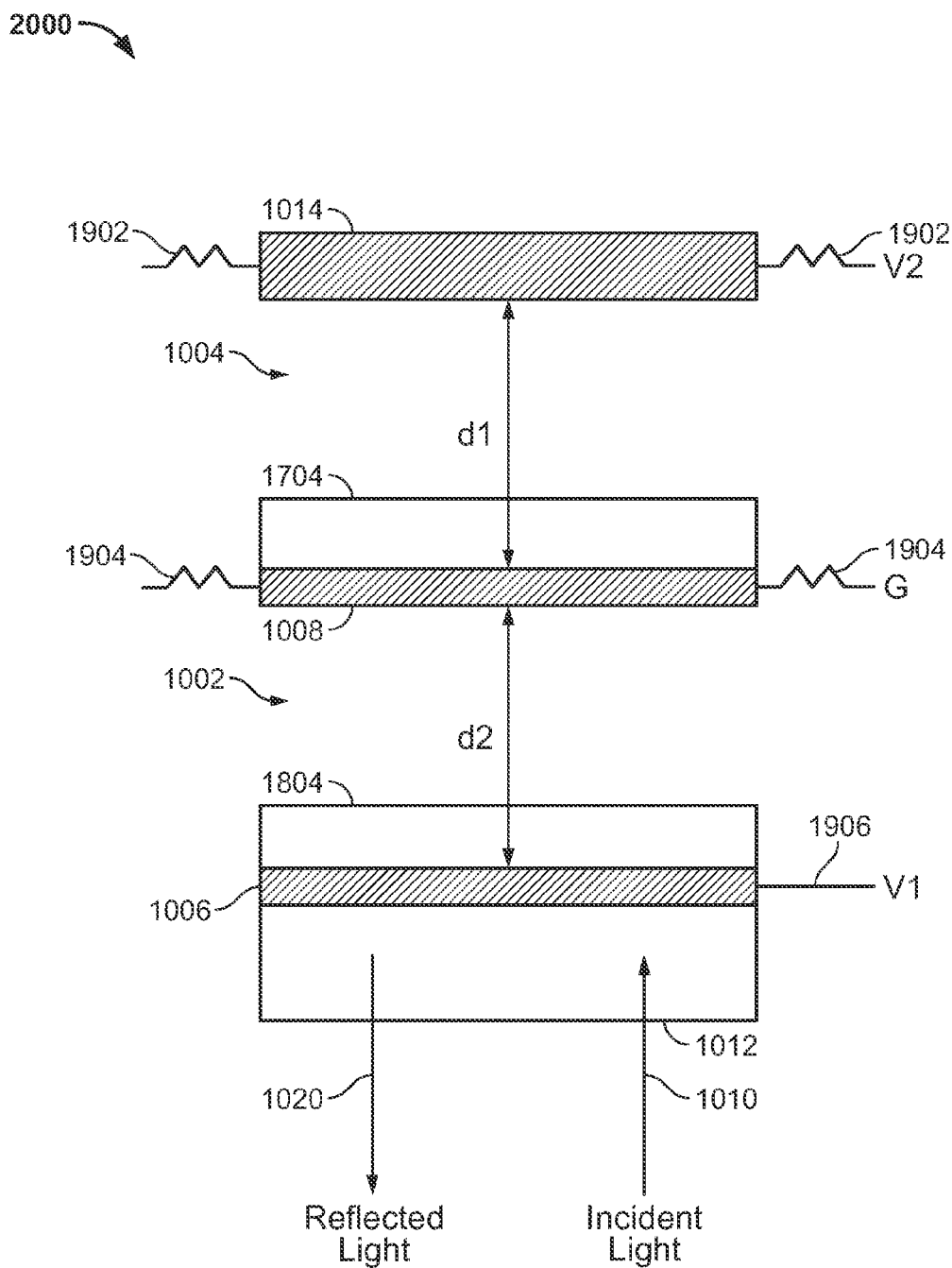
FIG. 20 also shows an example of a cross-sectional schematic illustration of an analog interferometric modulator having two gaps and an implementation for changing the height of the gaps.

FIG. 19 shows an example of a cross-sectional schematic illustration of an AIMOD 1900 having two gaps and an implementation for changing the height of the gaps. FIG. 20 also shows an example of a cross-sectional schematic illustration of an AIMOD 2000 having two gaps and an implementation for changing the height of the gaps. Referring to both FIGS. 19 and 20, the illustrated AIMODs 1900 and 2000 are each configured similar to the AIMOD illustrated in FIG. 18, having a movable mirror 1014, a movable first absorbing layer 1008, a first gap 1004 disposed between and defined by the movable mirror 1014 and the first absorbing layer 1008, a stationary second absorbing layer 1006 which is disposed on a substrate 1012, a second gap 1002 disposed between and defined by the second absorbing layer 1006 and the first absorbing layer 1008, and a dielectric layer 1704 disposed on the first absorbing layer 1008 and between the first absorbing layer 1008 and the mirror 1014, within the first gap 1004. In FIGS. 19 and 20, at least part of the first gap 1004 and at least part of the second gap 1002 can include an air gap. The first gap 1004 is configured to have a variable height dimension d1 which changes when the first absorbing layer 1008 and the mirror 1014 are moved to different positions. The second gap 1002 is configured to have a variable height dimension d2 which changes when the first absorbing layer 1008 is moved to different positions relative to the second absorbing layer 1006. In the implementation of FIGS. 19 and 20, the distance d1 is related to d1', where d1' is the optical distance between the first absorbing layer 1008 and the mirror 1014. The optical distance d1' takes into account the thickness and index of refraction of a dielectric layer 1704, and the penetration depth of light into the mirror 1014. Also, the distance d2 is related to d2', where d2' is the optical distance between the first absorbing layer 1008 and the second absorbing layer 1006. The optical distance d2' takes into account the thickness and index of refraction of a dielectric layer 1804.

In FIG. 19, AIMOD 1900 also include springs 1902 mechanically attached to the mirror 1014 and springs 1904 mechanically attached to the first absorbing layer 1008. In this implementation, the mirror 1014, the first absorbing layer 1008, and the second absorbing layer 1006 are configured as electrodes. The AIMOD 1900 also includes at least one electrical connection 1906 connected to the second absorbing layer 1006. Springs 1902 and 1904 can electrically couple the mirror 1014 electrode and the first absorbing layer 1008 electrode, respectively, to a drive circuit (such as the drive circuit illustrated in FIG. 2). The drive circuit can be configured to apply a voltage V1 across the first absorbing layer 1006 and the second absorbing layer 1008 to drive the first absorbing layer 1008. The mirror 1014 and the first absorbing layer 1006 Springs 1902 and electrical connection 1906 can be electrically coupled to a drive circuit (e.g., FIG. 2) which can be configured to apply a voltage V2 across the second absorbing layer 1006 and the mirror 1014 to drive the mirror 1014. Accordingly, applying driving voltages V1 and V2 can move the movable first absorbing layer 1008 and the mirror 1014 to synchronously position the first absorbing layer 1008 and the mirror 1014 at desired distances from the second absorbing layer 1006 such that the desired wavelengths of light are reflected from the AIMOD 1900.

FIG. 20 also shows an example of a cross-sectional schematic illustration of an AIMOD having two gaps and an implementation for changing the height of the gaps. The AIMOD 2000 can include similar structural elements as the AIMOD 1900. The mirror 1014, a first absorbing layer 1008, and a second absorbing layer 1006 are driving electrodes of the AIMOD 2000. However, in this implementation, the first absorbing layer 1008 is connected to ground or another common electrical point relative to the voltage V2 (applied across the mirror 1014 and the first absorbing layer 1008) and V1 (applied across the second absorbing layer 1006 and the first absorbing layer 1008). In some implementations, springs 1904 electrically connect the first absorbing layer 1008 to ground. The first absorbing layer 1008 and the second absorbing layer 1006 are electrically coupled to a drive circuit configured to apply a voltage V1 across the first absorbing layer 1008 and the second absorbing layer 1006. The first absorbing layer 1008 and the mirror 1014 are electrically coupled to a drive circuit configured to apply a voltage V2 across the first absorbing layer 1008 and the mirror 1014. Applying driving voltages V1 and V2 can move the movable first absorbing layer 1008 and the mirror 1014 to synchronously position the first absorbing layer 1008 and the mirror 1014 at a desired distance d1 from each other, and move the first absorbing layer 1008 relative to the stationary second absorbing layer 1006 to position first absorbing layer a desired distance d2 from the stationary second absorbing layer 1006 and the desired wavelengths of light are reflected from the AIMOD 2000.

Figure 21:
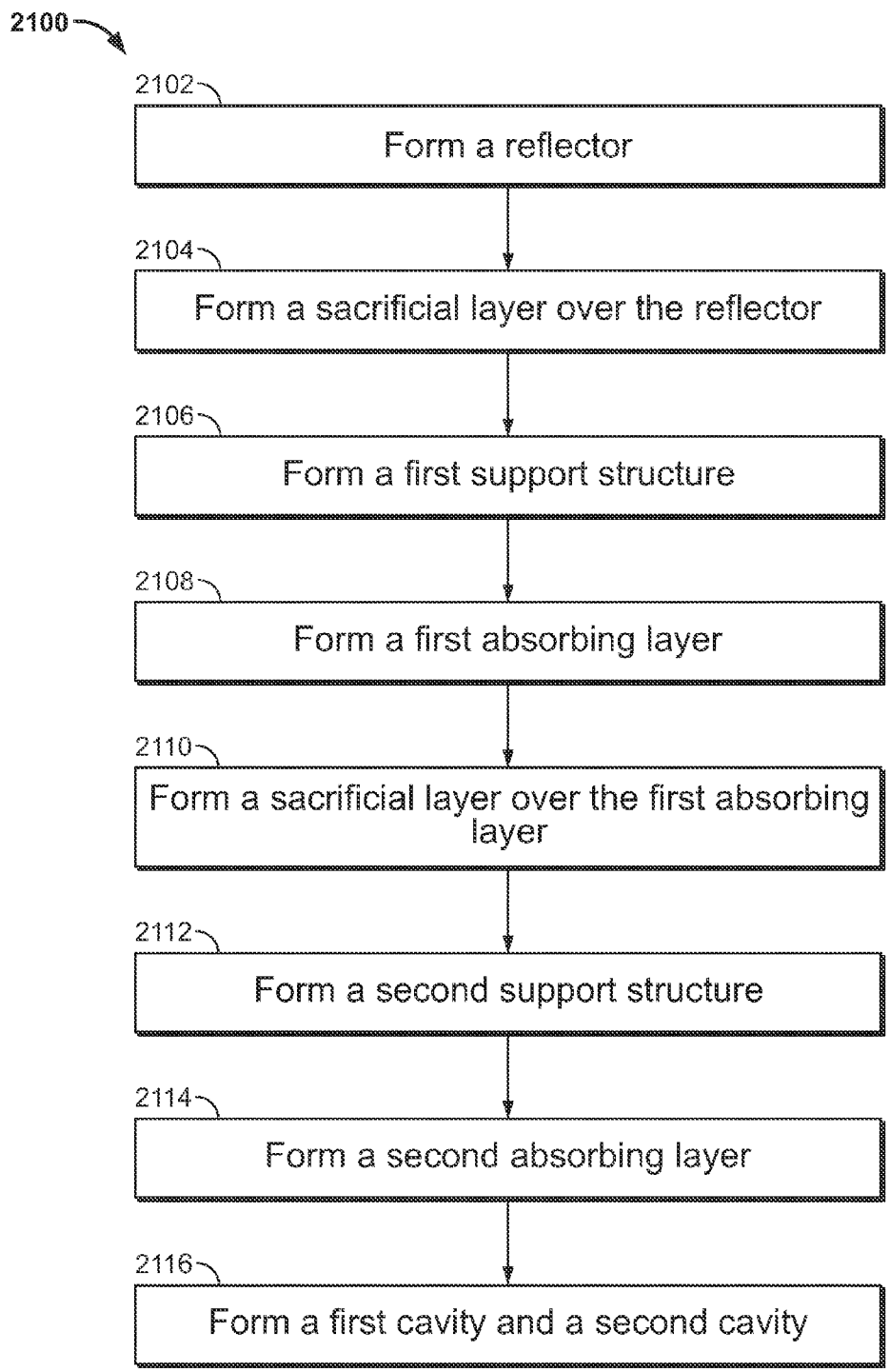
FIG. 21 shows an example of a flow diagram illustrating a manufacturing process for an analog interferometric modulator that has two gaps.

FIG. 21 shows an example of a flow diagram illustrating a manufacturing process for an AIMOD that has two gaps. FIGS. 22A-22G show examples of cross-sectional schematic illustrations of various stages in a method of making an AIMOD that has two gaps. Process 2100 shown in FIG. 21, illustrates a manufacturing process for an AIMOD that has two gaps, such as the example implementation illustrated in FIG. 10. Similar processes can be used to form the other AIMOD implementations described herein. The manufacturing process 2100 can include, but is not limited to, the manufacturing techniques and materials described in reference to FIGS. 8A-8E.

Figure 22A:
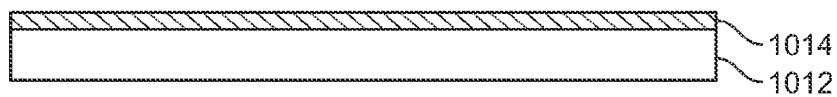
FIGS. 22A-22H show examples of cross-sectional schematic illustrations of various stages in a method of making an analog interferometric modulator that has two gaps.
Figure 22B:
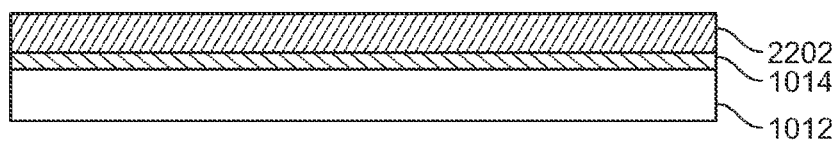
Figure 22C:
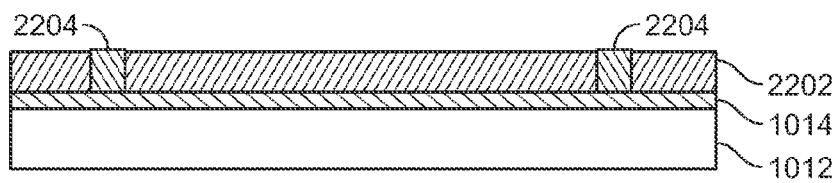
Figure 22D:
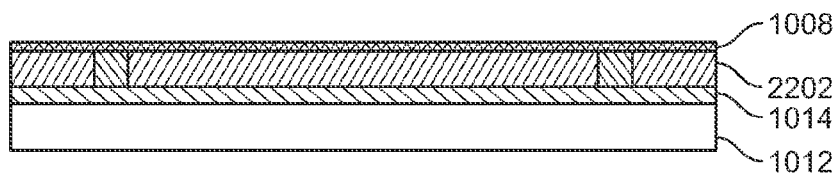

Referring to FIG. 21, in block 2102 a reflector (or mirror) 1014 is formed. In some implementations, the reflector 1014 can be formed on a substrate 1012. FIG. 22A illustrates an unfinished AIMOD device after completion of block 2102. In some implementations, deposition techniques such as PVD, PECVD, and CVD can be used to form reflector layer 1014. In such configurations, the substrate can be transparent or non-transparent. The process 2100 continues at block 2104 with the formation of a sacrificial layer 2202 over the reflector 1014. FIG. 22B illustrates an unfinished AIMOD device after completion of block 2104. In some implementations, deposition techniques such as PVD, PECVD, thermal CVD or spin-coating can be used to form the sacrificial layer 2202. The process 2100 continues at block 2106 with the formation of a first support structure 2204. FIG. 22C illustrates an unfinished AIMOD device after completion of block 2106. Such support structure can include a plurality of support structures 2204 that are disposed on one or more sides of a display element. The formation of the support structure 2204 can include patterning the sacrificial layer 2202 to form at least one support structure aperture, then depositing a material into the aperture to form the support structure 2204. The process continues at block 2108 with the formation of a first absorbing layer 1008 (or depositing a mechanical strengthening dielectric layer, such as this of dielectric layer 1704 in FIG. 17, before depositing the first absorber layer). FIG. 22D illustrates an unfinished AIMOD device after completion of block 2108. In some implementations, the first absorbing layer 1008 can include MoCr, and the absorbing layer 1008 can have a thickness of between about 2 nm and about 7 nm. The process 2100 continues at block 2110 with the formation of another sacrificial layer 2206 over the first absorbing layer 1008, using for example, the techniques indicated above.

Figure 22E:
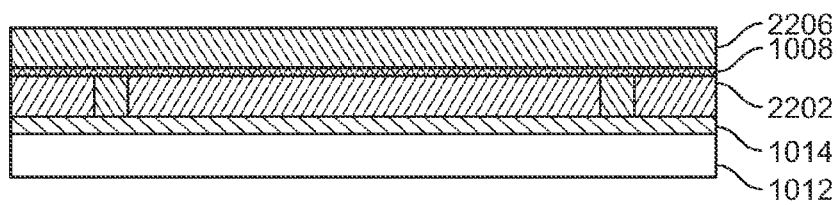
Figure 22F:
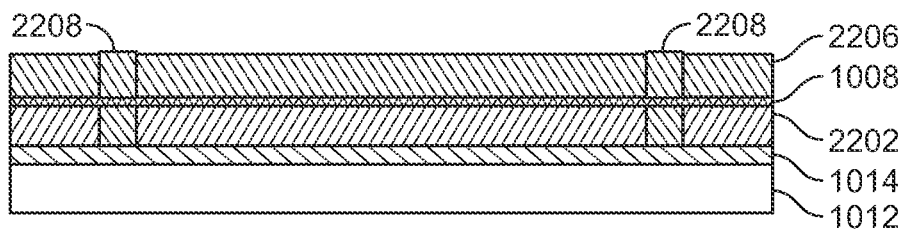
Figure 22G:
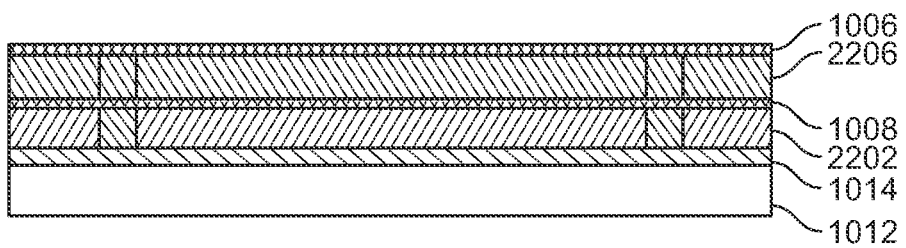
Figure 22H:
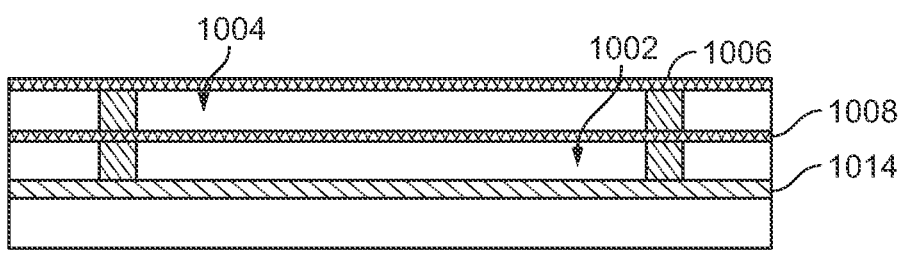

FIG. 22E illustrates an unfinished AIMOD device after completion of block 2110. The process 2100 continues at block 2112 with the formation of a second support structure 2208. FIG. 22F illustrates an unfinished AIMOD device after completion of block 2112. The second support structure 2208 can, in some implementations, be formed by patterning the sacrificial layer 2206 formed over the first absorbing layer 1008 to form at least one support structure aperture, then depositing a material into the aperture to form the support structure 2208. The process 2100 continues at block 2114 with the formation of a second absorbing layer 1006 over the sacrificial layer 2206 (or depositing a mechanical strengthen dielectric layer, such as that of dielectric layer 1704 in FIG. 17, before depositing the second absorber layer). FIG. 22G illustrates an unfinished AIMOD device after completion of block 2114. In some implementations, the second absorbing layer 1006 can include MoCr. The thickness of the second absorbing layer 1006 can be between about 0.5 nm and 4 nm. The process 2100 continues at block 2116 with the formation of a first gap 1002 between the reflector 1014 and the first absorbing layer 1008, and a second gap 1004 between the first absorbing layer 1008 and the second absorbing layer 1006. FIG. 22H illustrates an unfinished AIMOD device after completion of block 2116. The gaps 1002 and 1004 can be formed by exposing the sacrificial layers to an etchant. During the process 2100, apertures (not shown) that allow the sacrificial layers 2202 and 2206 to be exposed to an etchant may also be formed in the AIMOD. In different implementations, at least two of the reflector 1014, the first absorbing layer 1008, and the second absorbing layer 1006 are formed to be movable as described herein so that the height dimensions of a first and second gap can be correspondingly changed (increased or decreased) to affect the spectrum of wavelengths of light that are reflected by a display element.

Figure 23:
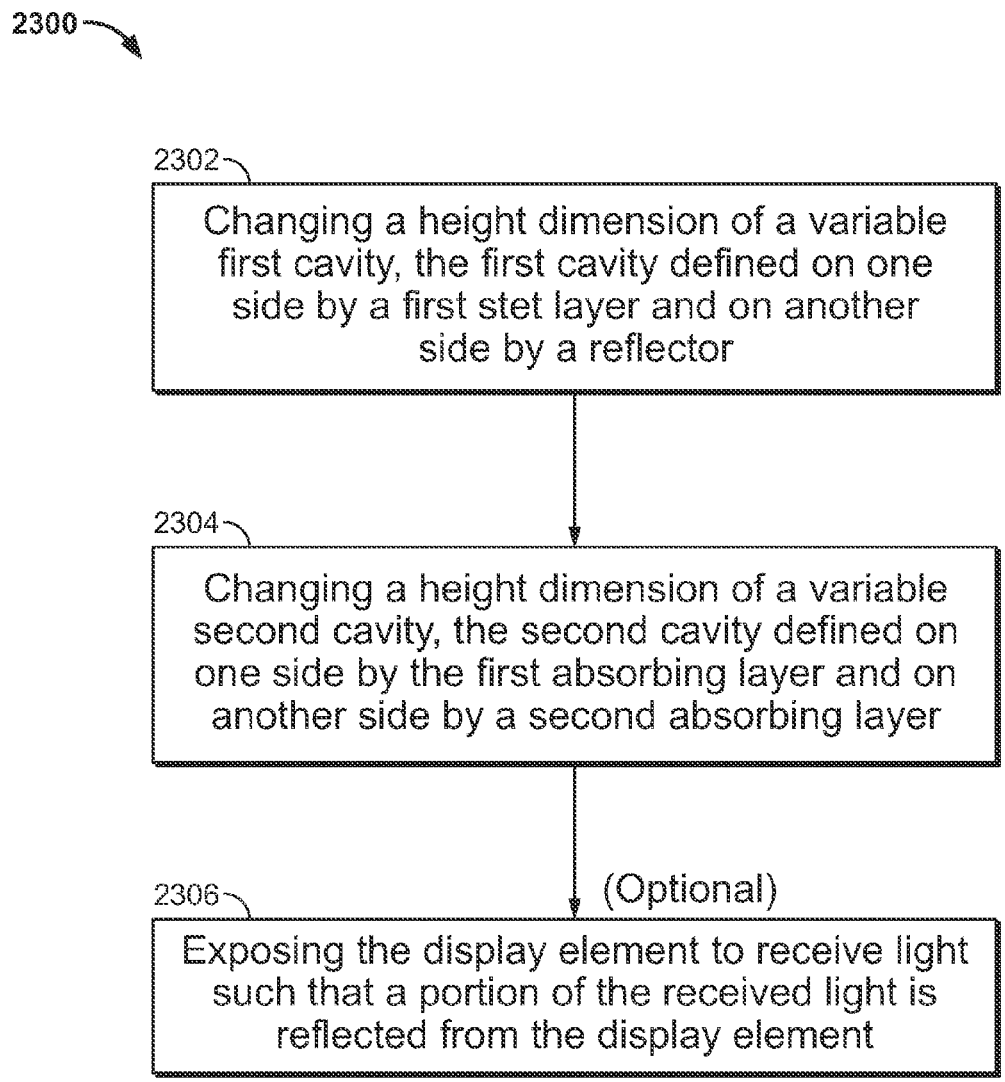
FIG. 23 shows an example of a flow diagram illustrating a method of displaying information on a display element.

FIG. 23 shows an example of a flow diagram illustrating a method of displaying information on a display element. In block 2302, the process 2300 includes changing a height dimension d1 of a variable first gap, the first gap defined on one side by a first absorbing layer and on another side by a reflector. Depending on the particular implementation, this can be accomplished by driving the first absorbing layer or the reflector, or both, to a different position relative to each other. For example, in the implementation illustrated in FIG. 16, this could be accomplished by moving the mirror 1014 and/or the first absorbing layer 1008. In FIG. 10 where the mirror 1014 can be configured to be stationary, this can be accomplished by moving first absorbing layer 1008. The first absorbing layer and/or the reflector can be driven by drive signals (voltages) provided by a driving circuit, for example, as illustrated in FIGS. 2 and 24B.

Moving to block 2304, the process 2300 further includes changing a height dimension d2 of a variable second gap, the second gap is defined on one side by the first absorbing layer and on another side by a second absorbing layer. Again, depending on the implementation, this can be accomplished by moving one or both of the first and second absorbing layer. For example, in the implementation illustrated in FIG. 16, this could be accomplished by moving the first absorbing layer because the second absorbing layer can be configured to be stationary. In FIG. 10, this can be accomplished by moving the first absorbing layer 1008 and/or the second absorbing layer 1006. In any of the configurations, moving the first absorbing layer, the second absorbing layer, and/or the mirror are done correspondingly to adjust the height dimensions of the gaps. In other words, because moving the first absorbing layer affects both the height of the first and second gaps, each of the first absorbing layer and the other movable layer (mirror or the second absorbing layer) must be moved taking into account the movement of the other such that desired height dimensions of the first gap and the second gap are obtained. The movable layers can be moved at least partially synchronously to achieve the desired height dimensions. The difference between distances d1 and d2 can be substantially equal to the light penetration depth on mirror (e.g., about 15 nm for Al), which can improve color saturation. In other words, in some implementations the difference between d1 and d2 can be less than about 50 nm, or in some implementations less than 15 nm. In another example, the height dimensions d1 and d2 can be related such that $(|d2-d1|)/((d1+d2)/2)$ is less than or equal to 0.25. The first absorbing layer and/or the second absorbing layer can be driven by drive signals (voltages) provided by a driving circuit, for example, as illustrated in FIGS. 2 and 24B.

Moving to optional block 2306, the process 2300 includes exposing the display element to receive light such that a portion of the received light is reflected from the display element. Changing the height dimensions d1 and d2 places the display element in a display state to have a certain appearance. In such a display state a portion of the received light propagates into the display element, through the first and second absorbing layers to the reflector (mirror). A portion of a spectrum of wavelengths of the light reflected from the mirror is absorbed by the first absorbing layer or the second absorbing layer, based at least in part on the height dimensions d1 and d2 (which positions the absorbing layers at different positions relative to the standing wave field intensity of the reflected wavelengths). Other non-absorbed light propagates through the absorbing layers out of the display element.

Figure 24A:
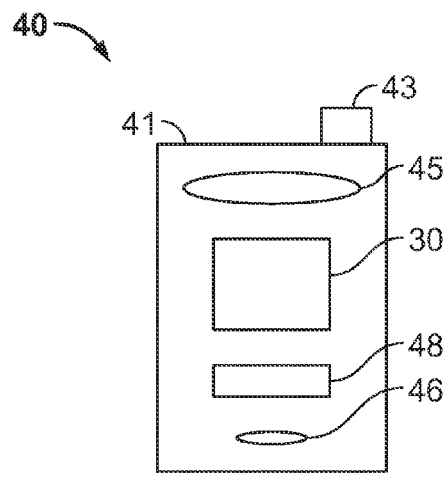
FIGS. 24A and 24B show examples of system block diagrams illustrating a display device that includes a plurality of interferometric modulators.
Figure 24B:
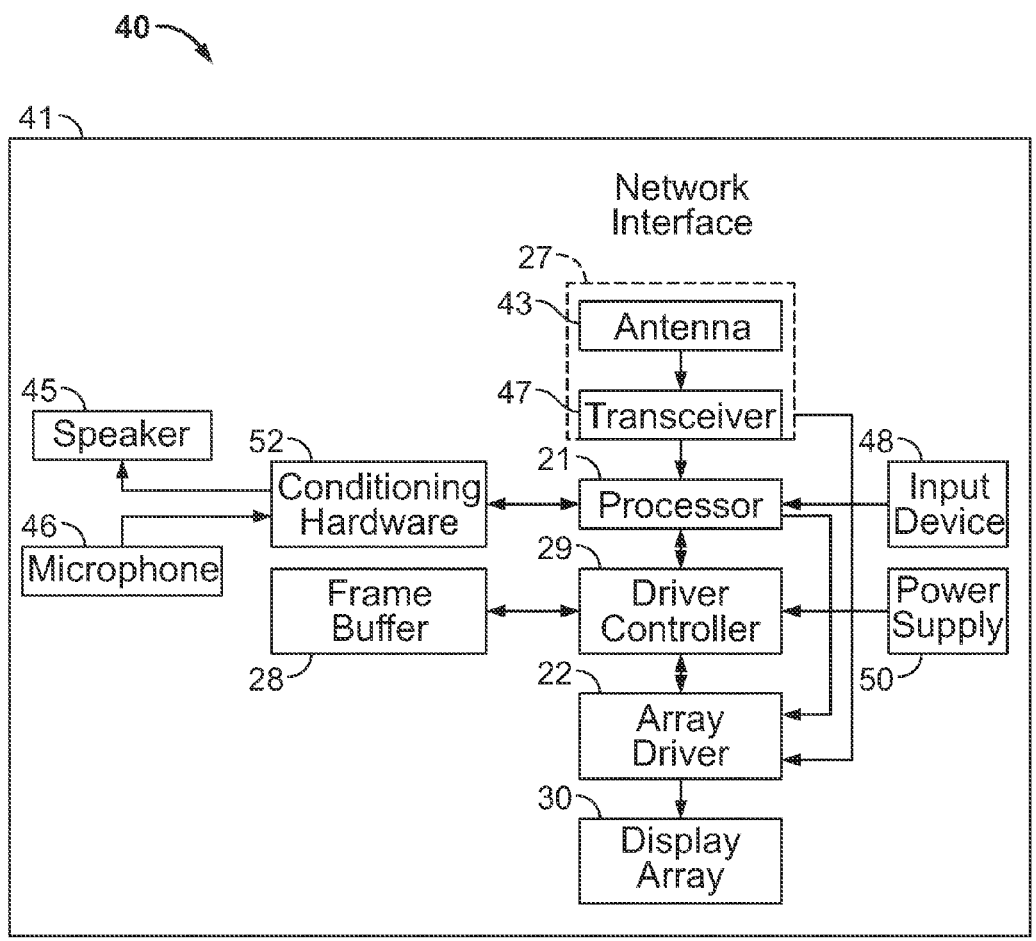

FIGS. 24A and 24B show examples of system block diagrams illustrating a display device that includes a plurality of interferometric modulators. The display device 40 can be, for example, a smart phone, a cellular or mobile telephone. However, the same components of the display device 40 or slight variations thereof are also illustrative of various types of display devices such as televisions, tablets, e-readers, handheld devices and portable media players.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 24B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photo-voltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions and processes described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method, algorithm or manufacturing process disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electromechanical display apparatus, comprising:
a reflective display pixel including
a reflector;
a first partially transmissive absorbing layer disposed from the reflector, the first absorbing layer and the reflector defining a first gap therebetween, the first gap having a thickness dimension of distance d1;
a second partially transmissive absorbing layer disposed from the first absorbing layer such that the first absorbing layer is between the second absorbing layer and the reflector, the second absorbing layer and the first absorbing layer defining a second gap therebetween, the second gap having a thickness dimension of distance d2; and
wherein at least two of the reflector, the first absorbing layer and second absorbing layer are movable to either increase or decrease the thickness dimension of the first gap and the second gap,
wherein the sum of the thickness of the first absorbing layer and the second absorbing layer is between about 3 nm and 12 nm.

2. The apparatus of claim 1, wherein the sum of the thickness of the first absorbing layer and the second absorbing layer is between about 5 nm and about 7 nm.

3. The apparatus of claim 1, wherein the display pixel is configured such that given a range of received light wavelengths $\lambda$min to $\lambda$max, distance d1<$\lambda$max, and d1+d2<2$\lambda$max.

4. The apparatus of claim 1, wherein at least two of the reflector, the first absorbing layer and second absorbing layer are movable such that the distances d1 and d2 place the first absorbing layer and the second absorbing layer, respectively, at consecutive dark fringes of a standing wave interference pattern of the desired display color resulting from the interference of the incident and reflected light.

5. The apparatus of claim 1, wherein the reflector and the first absorbing layer are movable by electrostatic forces when a first voltage is applied across the reflector and the second absorbing layer and a second voltage is applied across the reflector and the first absorbing layer.

6. The apparatus of claim 1, further comprising a substrate, wherein the second absorbing layer is disposed on the substrate.

7. The apparatus of claim 1, wherein the at least two absorbing layers are movable such that $(|d2-d1|)/((d1+d2)/2)$ is less than or equal to 0.25.

8. The apparatus of claim 1, wherein the first absorbing layer and the second absorbing layer include molybdenum-chromium (MoCr), vanadium (V), germanium (Ge), or tungsten (W).

9. The apparatus of claim 1, wherein the first absorbing layer is thicker than the second absorbing layer.

10. The apparatus of claim 1, wherein at least two of the reflectors, the first absorbing layer and second absorbing layer are movable such that the distances d1 and d2 place the first absorbing layer and the second absorbing layer at a distance of $\lambda/2\pm15$ nm and $\lambda\pm15$ nm, respectively, from the reflector, for a target primary color of light having wavelength $\lambda$.

11. The apparatus of claim 1, wherein the display pixel further comprises a movable dielectric layer having a thickness of between about 100 nm and 300 nm, and wherein the first absorbing layer is deposed on the dielectric layer.

12. The apparatus of claim 1, wherein the display pixel further comprises a dielectric layer having a thickness of between about 100 nm and 300 nm, and wherein the second absorbing layer is disposed on the dielectric layer.

* * * * *

UNITED STATES PATENT AND TRADEMARK OFFICE
CERTIFICATE OF CORRECTION

PATENT NO. : 8,995,043 B2
APPLICATION NO. : 13/306877
DATED : March 31, 2015
INVENTOR(S) : Jian Jim Ma Page 1 of 1

It is certified that error appears in the above-identified patent and that said Letters Patent is hereby corrected as shown below:

ON THE TITLE PAGE

In column 2 (First page, item 56) at lines 2-3, Under Other Publications, change "Minaturized" to --Miniaturized--.

IN THE SPECIFICATION

In column 2 at line 1, Change "min" to --$\lambda$ min--.

In column 2 at line 2, Change "µmax." to --$\lambda$max.--.

In column 21 at line 20, Change "(FIG.15B)" to --(FIG.15B).--.

Signed and Sealed this
Twenty-ninth Day of March, 2016

Michelle K. Lee
*Director of the United States Patent and Trademark Office*